United States Patent [19]

Bocci et al.

[11] Patent Number: 4,585,411
[45] Date of Patent: Apr. 29, 1986

[54] METHOD AND WALKING BEAM FURNACE FOR THE INTERMEDIATE HEATING OF PIPES IN HOT ROLLING MILLS

[75] Inventors: Giorgio Bocci; Sando Brizielli; Agostino Triuzzi; Stefano Deplano, all of Genoa, Italy

[73] Assignee: ITALIMPIANTI Societa Italiana Impianti p.a., Genoa, Italy

[21] Appl. No.: 627,003

[22] Filed: Jun. 29, 1984

[30] Foreign Application Priority Data

Jul. 6, 1983 [IT] Italy .............................. 12565 A/83
May 18, 1984 [IT] Italy .............................. 12519 A/84

[51] Int. Cl.$^4$ ........................... F27D 3/00; F27B 9/14; B65G 25/00; B65G 37/00
[52] U.S. Cl. .................................. 432/11; 198/463.5; 198/614; 198/774; 414/180; 432/122
[58] Field of Search ...................... 432/5, 11, 122, 124; 414/180; 198/474.1, 614, 774

[56] References Cited

U.S. PATENT DOCUMENTS

| | | | |
|---|---|---|---|
| 3,373,980 | 3/1968 | Borgkvist | 432/11 |
| 3,749,550 | 7/1973 | Suydam | 432/122 |
| 3,792,965 | 2/1974 | Bengtsson | 432/122 |
| 4,102,449 | 7/1978 | Shufran | 432/122 |
| 4,427,371 | 1/1984 | Unks | 432/11 |

Primary Examiner—John J. Camby
Attorney, Agent, or Firm—Berman, Aisenberg & Platt

[57] ABSTRACT

This invention relates to a method of and a walking beam furnace for the intermediate heating of pipes, or the like, in hot rolling mills, by means of a furnace located between the plug-mill and the sizing mill. According to the invention, in a forehearth (17) of the intermediate heating furnace, at the inlet side thereof, there is maintained a temperature which is lower than that at the outlet side, and which, anyway, is such that the hottest pipes will be cooled down and the coldest pipes will be heated up whereby, when exiting from said forehearth (17) of the furnace, the difference between the temperatures of the various pipes is zero or, at least, is small and, in any case, is smaller than that at the inlet, whereas in the successive chamber (18) of the furnace there is maintained such a temperature as to give the pipes the desired temperature when exiting from the furnace. Preferably, the forehearth (17) is not provided with burners and is heated in an indirect manner by the successive furnace chamber (18) which is provided with one or more burners (19). This invention also provides an intermediate heating furnace of the walking beam type, provided with loading or charging means (11;31) permitting some pipes, or the like, to be charged into the furnace even after an emergency interruption of the discharging operation.

15 Claims, 19 Drawing Figures

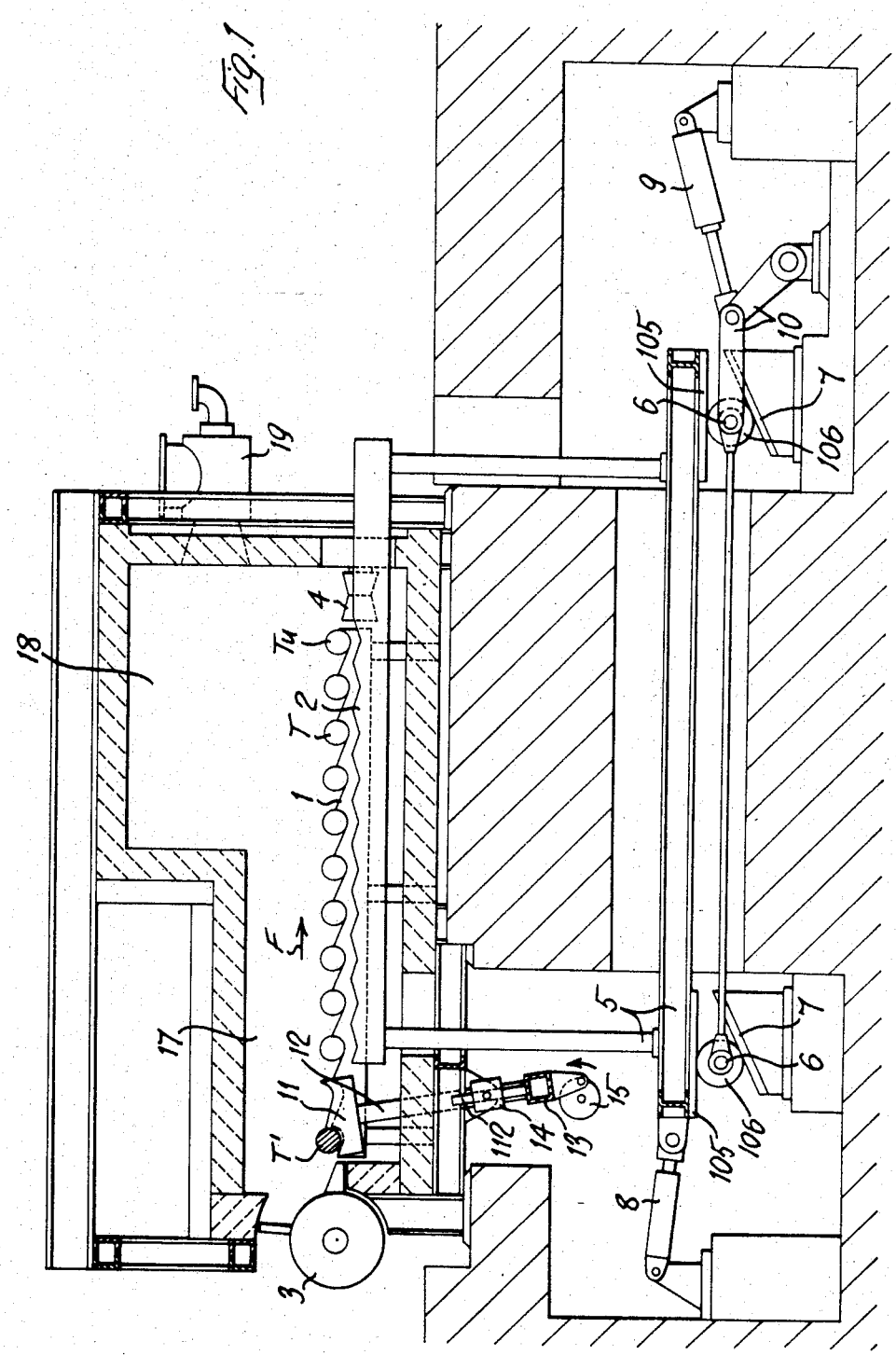

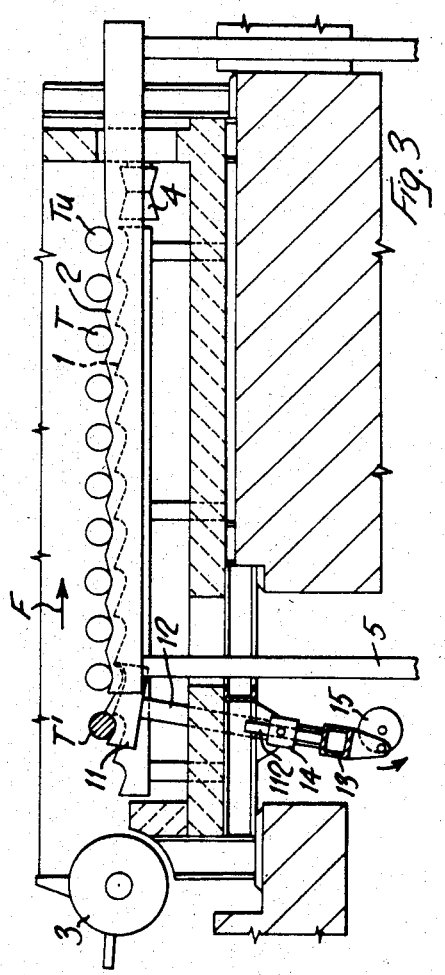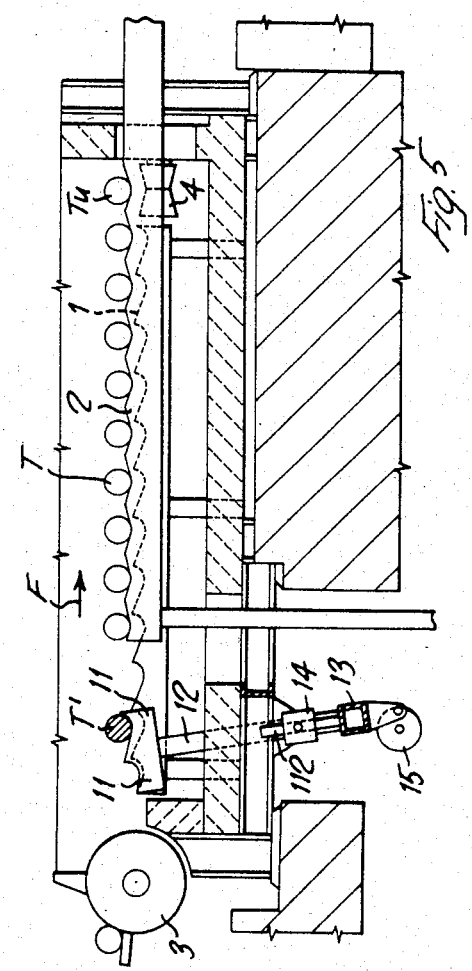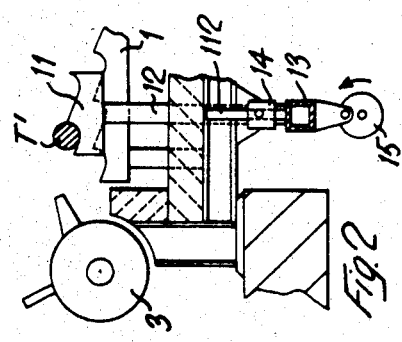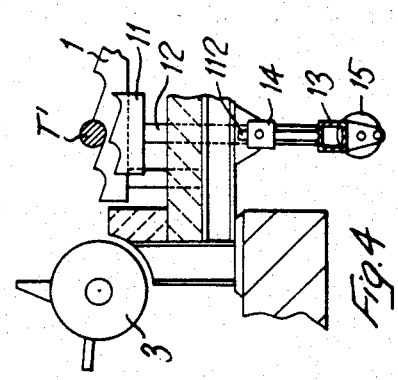

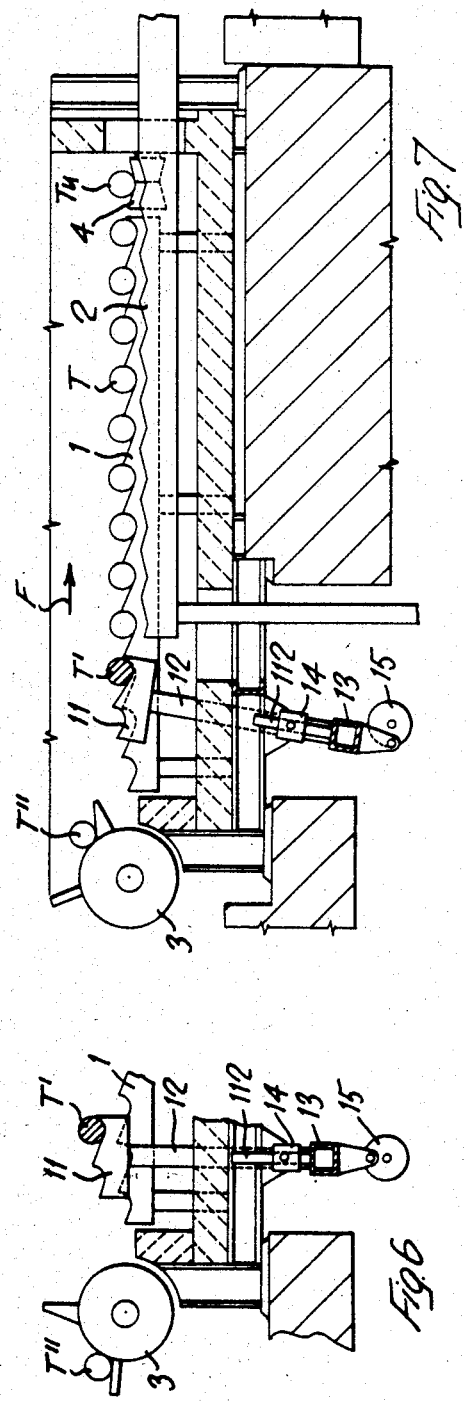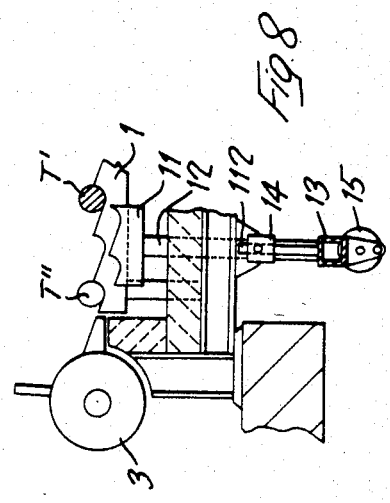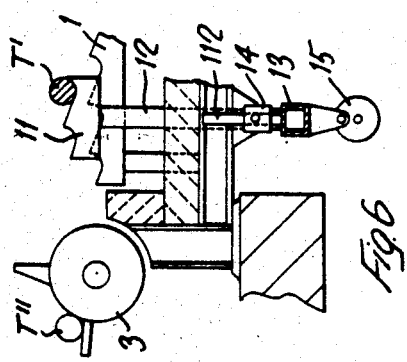

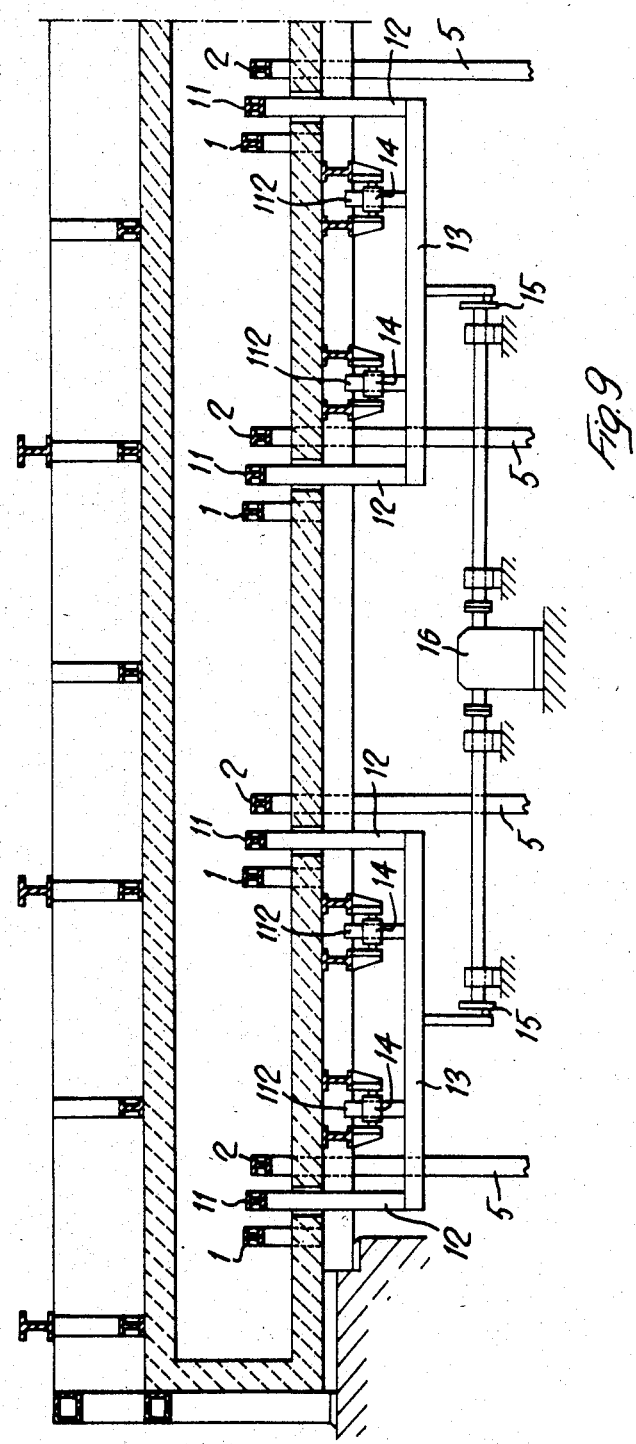

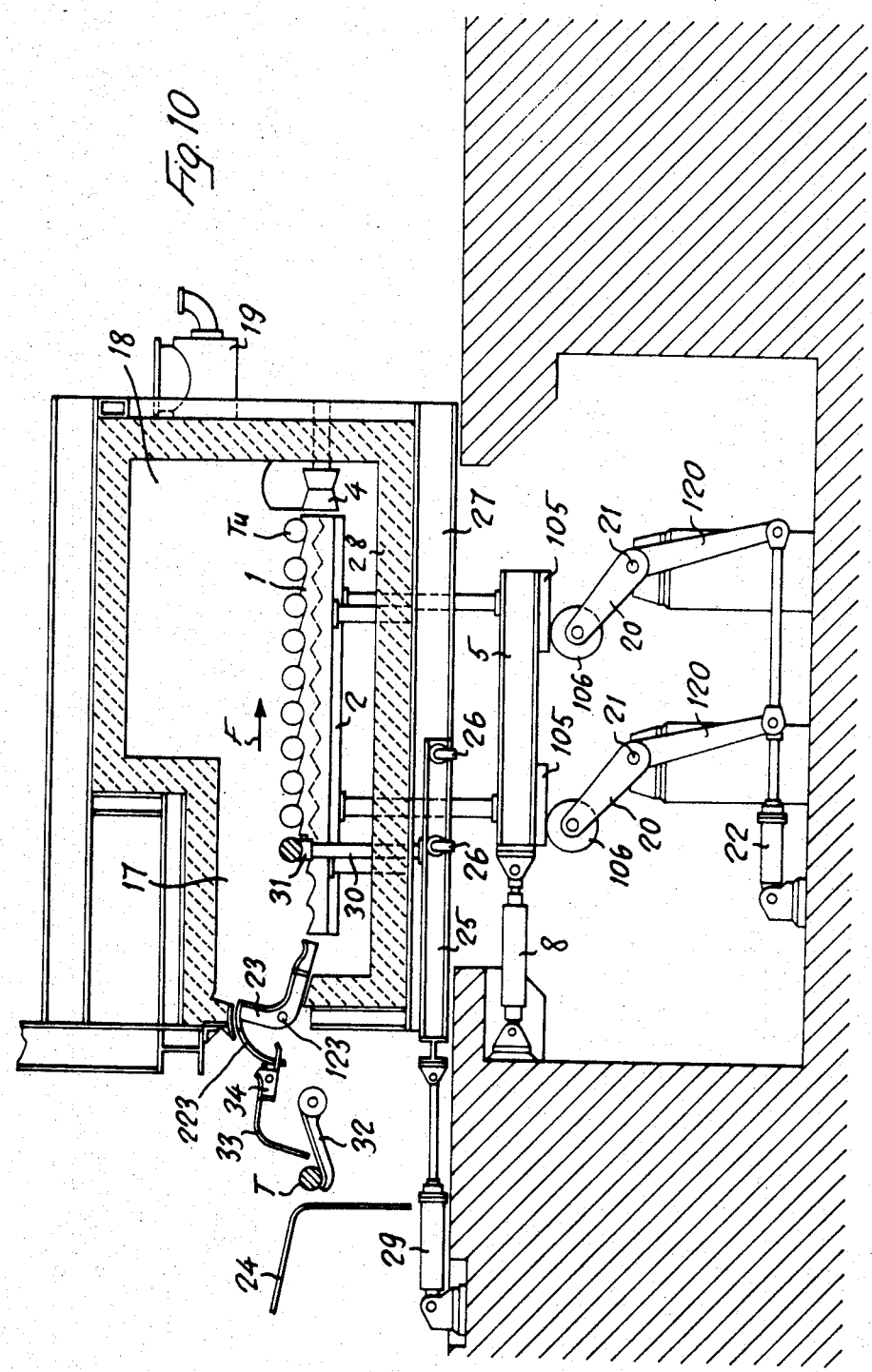

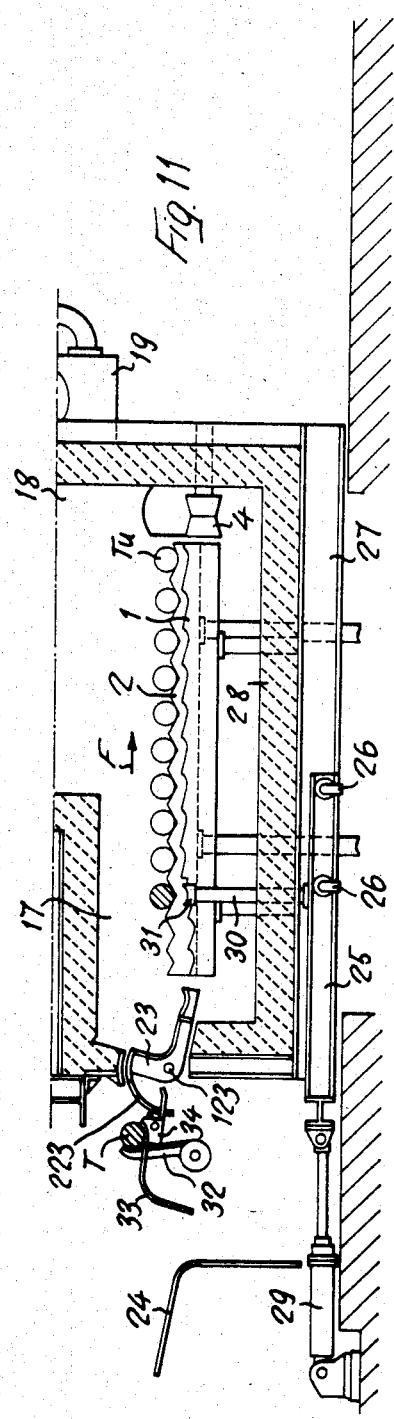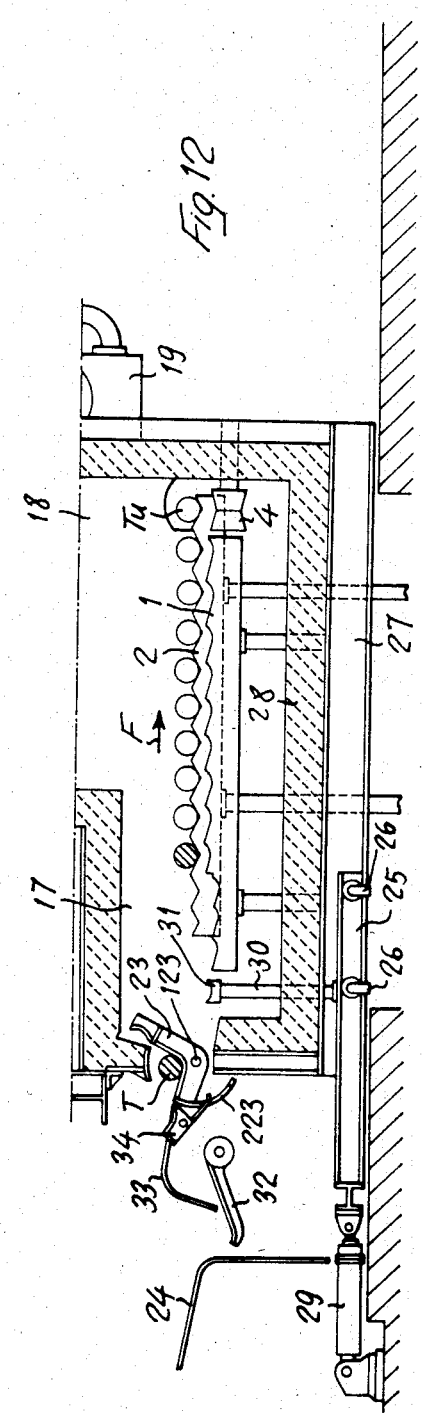

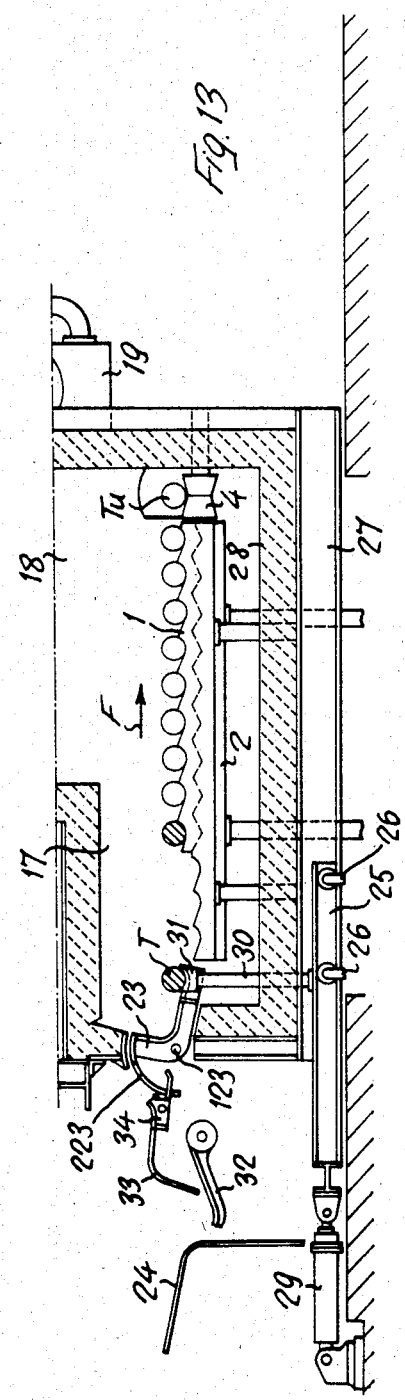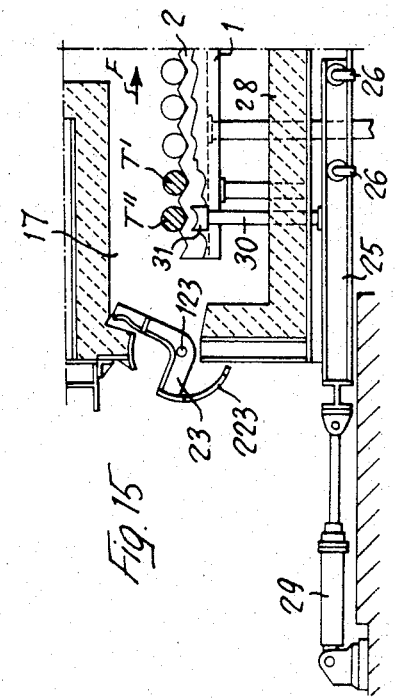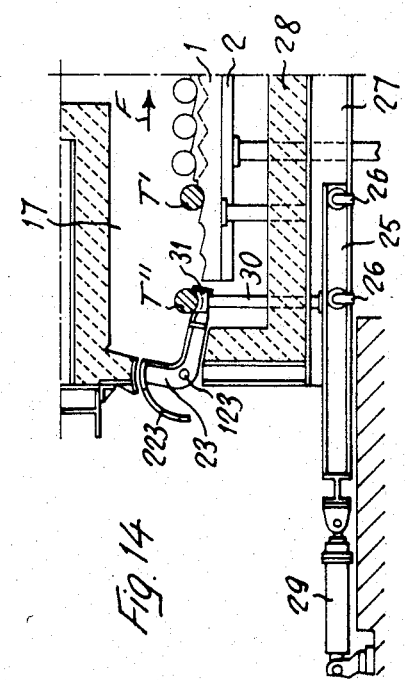

METHOD AND WALKING BEAM FURNACE FOR THE INTERMEDIATE HEATING OF PIPES IN HOT ROLLING MILLS

BACKGROUND AND SUMMARY OF THE INVENTION

This invention relates to a method of intermediate heating of pipes, or the like, in the hot manufacturing thereof. Moreover, the invention provides an intermediate heating furnace in hot rolling mills for pipes or the like, to carry out said method.

The hot pipe-manufacturing process comprises the following main steps:
- Heating of round or square billets from the ambient temperature up to the milling temperature (about 1280° C.).
- Rough-rolling of billets. On completion of this step, the rough-rolled pipes have a temperature of about 700°–1000° C.
- Heating or cooling of the rough-rolled pipes to a temperature of 920° to 980° C. (temperature equalization).
- Final sizing.

The rough-rolled pipes formed in the plug-mill and exiting from the respective mill at temperatures of 700° to 1000° C. are either heated or cooled in an intermediate treatment furnace, generally of the walking beam type, so as to have a substantially uniform temperature, for example of 930° to 950° C., at the beginning of the successive step of final sizing. This equalization of the temperature of the rough-rolled pipes prior to their final sizing is of particular importance for those pipes that must have high qualitative and metallurgical characteristics.

The intermediate heating furnaces used heretofore for the purposes specified above have a substantially uniform temperature throughout their length, which temperature is substantially the same as the desired discharge temperature of the rough-rolled pipes from the furnace. However, since the rough-rolled pipes enter the furnace at different temperatures, they will acquire the desired discharge temperature after different periods or distances from their introduction into the furnace; therefore, they will be maintained for different time periods at the temperature existing in the furnace. The length of the heretofore known furnaces is established as a function of the lowest temperature of the rough-rolled pipes upon their introduction into the furnace. As a consequence, a relatively high number of rough-rolled pipes that were at a higher temperature upon their introduction into the furnace, are maintained in the furnace at a costant discharge temperature for so long a time period as to cause in the grain thereof undesired metallurgical changes impairing the quality of the final product. This quality, therefore, cannot be maintained strictly constant, whereby a greater quantity of pipes will be rejected upon qualitative inspection.

The invention aims to overcome these disadvantages and it resides substantially in the fact that the pipes are first introduced into a forehearth which is formed in a first portion of the intermediate heating furnace, at the inlet side thereof, wherein the temperature is maintained below the outlet temperature and below the temperature which would cause metallurgical changes in the grain of the steel constituting the pipes. The pipes which are cooler than said forehearth will be heated up; the pipes which are at a temperature proximate to that of said forehearth will maintain their temperature during the whole or a fraction of the whole stay thereof in said forehearth, however with no change in the grain thereof; the pipes which are hotter will be cooled down and, though their temperature is maintained during a certain time period above the grain-impairing temperature, their grain will not be impaired because the latter phenomenon occurs when the temperature is constant, and not when it is decreasing.

The stay of the pipes in the forehearth is such that, at the outlet therefrom and inlet into the successive section of the furnace, the temperature differential between the various pipes in nullified or at least minimized and is equal or very proximate to the temperature of said forehearth. In a successive section of the furnace, the pipes are heated up from the temperature they had reached in the forehearth to the desired temperature of discharge from the furnace, through a constant heating step, which prevents the grain from undergoing metallurgical changes despite of the high temperature, because this phenomenon occurs only if said temperature is constantly maintained during a certain period. Small differences between the temperatures of the pipes upon their introduction into the second section of the furnace may entail the establishment of a constant temperature which might be dangerous for the grain of some pipes, but such a constant temperature lasts only a limited time so that the grain undergoes no undesired change.

To carry out the above method, the invention provides an intermediate heating furnace, particularly of the walking beam type, in hot rolling mills for pipes or the like, said furnace being located between the plug-mill and the sizing mill, and substantially characterized in that it comprises, at the inlet side of the furnace, a forehearth which is preferably devoid of burners and is heated indirectly by the successive furnace chamber which is provided with one or more burners.

A particular problem in the intermediate heating of pipes or the like in the hot manufacturing thereof, resides in the fact that between the plug-mill and the intermediate furnace there may be a certain number of rough-rolled pipes, generally one to four depending upon the particular installation, having a temperature ranging from 700° to 1000° C., which pipes shall be introduced into the intermediate furnace to equalize their temperature to the outlet temperature of about 920° to 980° C. In case of disactivation of the sizing mill downstream of the intermediate furnace, the pipes in said intermediate furnace cannot be discharged therefrom, and said pipes between the plug-mill and the intermediate furnace cannot be introduced into the furnace and must be discharged as waste material with resulting loss of product, because they will cool excessively and the intermediate furnace, when the normal cycle is resumed, has not a sufficient thermal capacity to heat them up to the temperature of about 920° to 980° C., i.e., the temperature that the pipes must have when reaching the sizing mill. In fact, intermediate furnaces for equalizing the temperature of the rough-rolled pipes are low-cost furnaces, generally of the walking beam type, wherein a control system with a processor or with pyrometers for regulating the thermal cycle would be too expensive. However, the furnace must ensure the utmost reliability as to the temperature of the rough-rolled pipes discharged therefrom.

To overcome this disadvantage, according to the present invention, some recesses or grooves are left available, i.e. empty, at the inlet side of the furnace either in the stationary beams and in the walking beams during the normal operation, so that, when the pipes existing between the rough-roller or plug-mill and the furnace are to be introduced into the furnace with no possibility to discharge as many pipes therefrom due to any trouble in the apparatus downstream thereof, said available grooves can be used to accommodate said pipes that, otherwise, could not be introduced into the furnace and should be discharged. Upon resumption of the normal operating conditions, before starting the rough-roller and, therefore, conveying more rough-rolled pipes into the furnace, a few normal operating cycles are carried out so as to discharge the exceeding pipes, corresponding to the grooves to be left available during the normal operation. Thereafter, the normal loading of pipes into the furnace and simultaneous unloading therefrom is resumed.

To achieve the object of having said available emergency grooves at the inlet side of the furnace without affecting the normal course of the loading, progressing and unloading cycles of the pipes, and to meet the emergency requirements, the intermediate heating furnace according to the invention, usually a walking beam furnace, is provided at its interior—just after the inlet door for the rough-rolled pipes, or the like—with a charger device which advances each introduced tube, above the stationary and walking beams and over the length thereof comprising the grooves to be left available for any emergency, while the walking beams are lowered, to a position permitting the walking beams, in the successive lifting step, to pick up the pipe from the charger device by means of the first groove that is devoid of pipes. Successively, the walking beams are advanced and are lowered to lay down on the stationary beams the last picked up pipe in a range with the pipes introduced previously, so as to leave the required empty grooves on the stationary and the walking beams. During this latter advancing and lowering movement of the walking beams, the leading pipe of the range of pipes is transferred onto the roller discharge pathway so that said pipe can be discharged from the furnace.

The charger device, therefore, permits the pipes to be charged into the furnace at the same rate they are discharged therefrom and the cycle described above, therefore, meets the normal operating condition, while having at the inlet side a certain number of free grooves. In case of disactivation of the sizing mill and, therefore, discontinuance in discharging the rough-rolled pipes from the intermediate furnace, said available free grooves can accommodate, by action of said charger device, the rough-rolled pipes existing between the plug-mill and the intermediate furnace, thus avoiding the discarding thereof and, therefore, the relevant loss of production and obtaining a considerable saving of energy because, once introduced into the furnace, the pipes keep their heat that, otherwise, would be lost. For this purpose, the charger device will deposit the rough-rolled pipes into the grooves left available and will position them therein as they are introduced into the furnace whereas the trailing pipe is left on the charger, this result being obtained by merely raising and lowering, and not by translating, the walking beams that pick up each pipe from the charger device and lay it down onto the fixed beams and into the empty grooves while no pipe is discharged from the furnace.

BRIEF DESCRIPTION OF THE DRAWINGS

These and other characteristics of the invention and the advantages resulting therefrom will be apparent with greater details from the following description of some preferred embodiments thereof shown by way of nonlimitating examples in the accompanying drawings, wherein:

FIG. 1 is a diagrammatic vertical longitudinal sectional view of a walking beam furnace constructed according to this invention and used as intermediate furnace in a hot rolling mill for pipes.

FIGS. 2 to 8 are fragmentary sectional views similar to FIG. 1, showing some operational successive positions of the charger device and walking beams of the furnace, during one cycle of movements of the latter.

FIG. 9 is a diagrammatic vertical cross-sectional view of the furnace.

FIGS. 11 to 13 are fragmentary sectional views similar to FIG. 10 of some operational successive positions of the charger device and walking beams of the furnace, in one cycle of movements of the latter during the normal operation.

FIGS. 14 to 19 are fragmentary sectional views similar to FIGS. 10 to 13 of some operational successive positions of the charger device and transfer walking beams of the furnace during the emergency operation, wherein pipes are introduced into the furnace while no simultaneous discharge of pipes is effected therefrom.

DESCRIPTION OF THE PREFERRED EMBODIMENTS

Figure 16:
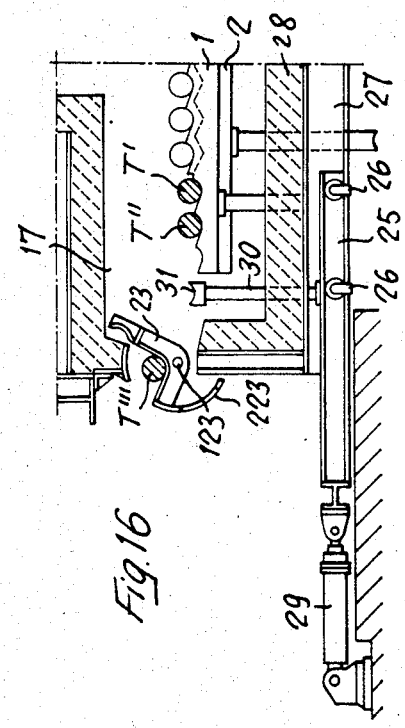

With reference to FIGS. 1 to 9, the intermediate heating furnace in a hot rolling mill for pipes is formed by a walking beam furnace comprising stationary or fixed beams 1 and transfer walking beams 2. The fixed beams 1 and walking beams 2 are formed at the top side thereof with pipe-carrying grooves or recesses each adapted to accommodate one rough-rolled pipe T coming from the plug-mill and to be transferred to the sizing mill. The numeral 3 indicates the rotatable door for the introduction of the rough-rolled pipes into the furnace, and the numeral 4 indicates the powered roller-pathway for the transfer of the pipes.

The walking beams 2 are carried by a support structure 5 resting in a known manner, through bottom horizontal and longitudinal rails 105, on corresponding supporting wheels (not shown) mounted on carriages 6 which rest, in turn, through rolling wheels 106, on inclined fixed rails 7. The horizontal movement of the walking beams 2 forwards (in the direction indicated by the arrow F) and backwards is obtained by moving the support structure 5, for example, by the action of the actuating hydraulic cylinder 8, on the supporting wheels of the stationary carriages 6. The upward and downward vertical movement of the transfer walking beams 2 is obtained by moving the carriages 6, for example, by means of the actuating cylinder 9 and leverage 10, back and forth over the inclined rails 7.

In the exemplary embodiment illustrated herein, the transfer walking beams 2 extend toward the inlet door 3 only to the third groove of the fixed beams 1, i.e. they can pick up—as the leading pipe T at the inlet side—the pipe T accommodated in the third groove of the fixed beams 1 from the inlet end thereof. Between the inlet door 3 and the transfer walking beams 2, there is provided an assembly of charger walking beams 11, which are of comparatively short length and are formed—in this exemplary embodiment—with two pipe-carrying grooves. These charger walking beams 11 perform a cycle of movements which is similar to that of the transfer walking beams 2, in co-operation with the first section of the fixed beams 1 at the inlet side, and they may be actuated for this purpose in any suitable manner.

In the illustrated exemplary embodiment, the charger walking beams 11 are secured to supporting structures comprising uprights 12 and crosspieces 13 and are slidably guided, through guiding uprights 112, within tubular guides 14 swingably mounted about horizontal axes on the furnace structure. Each supporting structure 12, 112, 13 of the charger walking beams 11 is imparted a reciprocating raising and lowering movement and a reciprocating movement in the direction of advance F by means of a crank 15 which is pivotally connected thereto and which is actuated by a suitable motor-reducer 16.

The frequency of the movements performed by the charger walking beams 11 is higher than that of the movements of the transfer walking beams 2, so as to obtain the following operations, shown in the FIGS. 1 to 8:

It is assumed that a rough-rolled pipe T' to be heated, introduced into the furnace through the door 3 and shown with hatching lines in the FIGS. 1 to 8, is in the first pipe-carrying groove of the fixed beams 1, and that the transfer walking beams 2 are in their lowered and rearmost position and the charger walking beams 11 are in their rearmost and partly raised position, with their first pipe-carrying groove in co-axial and flush relation with the first pipe-carrying groove of the fixed beams 1, as shown in FIG. 1. Thereafter, the charger beams 11 pick up the first pipe T' which has been fed to the first pipe-carrying groove of the fixed beams 1 (FIG. 2) and move forwards in the direction of the arrow F (FIG. 4) to deposit the pipe T' into the second pipe-carrying groove of the fixed beams 1 (FIG. 5). The charger beams 11, then, move back to their original position (FIG. 5) and thereafter, with an upward movement and a translatory movement in the direction of the arrow F, pick up by means of their second groove the pipe T' from the fixed beams 1 (FIG. 6) and transfer said pipe to the third pipe-carrying groove of the fixed beams 1 (FIGS. 7 and 8). From this position onwards, the transfer walking beams 2 take over and, with an upward movement (FIG. 3) and a translatory forward movement (FIG. 5), will position the pipe T' into the fourth pipe-carrying of the fixed beams 1 while the last pipe Tu at the outlet side of the furnace is discharged onto the roller pathway 4 to be taken out of the furnace (FIG. 1).

In case of emergency, when the sizing mill downstream of the furnace is disactivated, the roller pathway 4 will be devoid of pipes and the first three pipe-carrying grooves of the fixed beams 1 at the inlet side are empty, while the transfer walking beams 2 are in their lowered rearmost position. Therefore, three more pipes can be introduced into the furnace with the following procedure: Through the door 3, the first of three pipes is introduced into the furnace and is positioned in the first pipe-carrying groove of the fixed beams 1, while the charger beams 11 are in their rearmost and partially raised position. Said first pipe is then lifted by the charger beams 11 and translated in the advance direction F to be laid down into the second pipe-carrying groove of the fixed beams 1. Thereafter, while the charger beams 11 move back to their initial position, a second pipe is introduced into the furnace through said door and is accommodated in the first pipe-carrying groove of the fixed beams 1. By means of a successive cycle of movements of the charger beams 11, said two pipes are advanced one step so as to transfer the first pipe into the third pipe-carrying groove of the fixed beams 1 and the second pipe into the second pipe-carrying groove of the fixed beams 1, thus clearing the first pipe-carrying groove of the fixed beams 1 which will accommodate the third pipe which is introduced into the furnace through the door 3. Therefore, the first three pipe-carrying grooves of the fixed beams 1 are also filled with the rough-rolled pipes which are between the plug-mill and the intermediate furnace and which, otherwise, should be discarded as waste material with resulting considerable loss of production and energy. Upon resumption of the normal conditions, i.e. when the sizing mill downstream of the furnace starts working again, three normal feeding cycles of the transfer walking beams 2 and charger walking beams 11 will be performed, in synchronism with each other and without introducing any new rough-rolled pipes, so as to get rid of the previously introduced pipes which are available in the first three pipe-carrying grooves of the fixed beams 1, whereby to restore the conditions of FIG. 1.

Of course, the transfer walking beams 2 may pick up pipes T from either the second or the fourth or fifth pipe-carrying groove of the fixed beams 1, and the charger beams 11 may then be formed with either one or three or four pipe-carrying grooves.

The walking beam furnace according to the invention, used as an intermediate heating furnace between a preceding plug-mill and a following sizing mill for pipes, comprises, at the inlet side, a forehearth 17 which is, preferably, not provided with burners and is heated indirectly by the successive chamber 18 of the furnace, which is provided with one or more burners 19. The forehearth 17 has such a length and a temperature whereby the rough-rolled pipes coming form the preceding plug-mill and having temperatures ranging from 700° and 1000° C. will substantially uniformize their temperatures while traveling through the forehearth 17 of the furnace so as to enter the successive chamber 18 substantially at the same temperature, which is lower than their temperature at the outlet of the furnace. The temperature in the forehearth is kept below the level which causes metallurgical changes in the grain of the material of the pipes, for example a temperature of about 800°–850° C. Therefore, the pipes which are introduced at a lower temperature are heated in the forehearth 17 up to the temperature, for example, of about 850° C., whereas the pipes which are introduced at a higher temperature are cooled down in the forehearth 17 to substantially the same temperature, for example, of about 850° C. As a consequence, in the successive chamber 18 of the furnace, all the pipes are heated substantially to the same desired discharge temperature, for example, to a temperature between 920° C. and 980° C. Practically, the forehearth 17 is dimensioned on the basis of the hottest rough-rolled pipe to be charged and to be cooled (taking also into account the thickness thereof), whereas the successive chamber 18 of the furnace is dimensioned and operated so that, at the outlet thereof, the pipes have substantially the same desired discharge temperature, however without staying in the chamber 18 at constant temperature and/or for too long time periods such as to entail a danger of metallurgical changes in the grain thereof.

The walking beam furnace according to the exemplary embodiment of FIGS. 10 to 19 is substantially similar to that of FIGS. 1 to 9, the same or the equivalent parts being indicated by the same reference numerals. The portion of the fixed beams 1 toward the inlet at the introduction side, corresponding to three grooves in the example, according to the invention, is located at a lower level than the remainder portion for operational requirements to be explained below. Again, the walking beams 2 are carried by a supporting structure 5 resting, through bottom rails 105, on corresponding bearing wheels 106 which, however, are mounted on bell-crank supports 20, 120 pivoted at 21 and actuated parallelly to the rails 105 by a hydraulic actuating cylinder 22. The horizontal movement of the transfer walking beams 2 onwards, i.e. in the feeding direction indicated by the arrow F, and backwards is obtained by moving the supporting structure 5, for example, by means of the hydraulic actuating cylinder 8 over the bearing wheels 106 of the stationary bell-crank supports 20, 120. The vertical movement of the transfer walking beams 2 upwardly and downwardly is obtained by displacing the wheels 106 or by rotating the bell-crank supports 20, 120 by means of the hydraulic actuating cylinder 22. The numeral 4 indicates the powered roller pathway to discharge the pipes to be conveyed out of the furnace.

The furnace is provided with a charger device comprising a door 23 having an "L"-shape in cross section and capable of oscillating on a pivot 123 located at the corner of the "L" so that the concavity of the "L" is facing upwards at all times. The door 23, in the position thereof overturned outwards (see FIGS. 12 and 16), receives a pipe coming from the rough-roller through a chute 24 and falling into said concavity. While moving to its position fully overturned into the furnace (FIGS. 10, 11, 13, 14), said door 23 introduces the pipe into the furnace to load said pipe onto the charger device proper. This charger device comprises a bearing carriage 25 resting through wheels 26 on guides 27 formed in the outer structure of the furnace below the hearth 28 of the furnace, so that the carriage 25 can slide over said guides 27 along the length of the furnace. The carriage 25 is actuated by external movers, preferably a hydraulic actuating cylinder 29. The carriage 25 has secured thereto uprights 30 each carrying a pipe-carrying support 31 comprising a pipe-receiving groove. The number of uprights 30 and supports 31 is generally the same as that of the walking beams 2. Said uprights 30 are passed through the hearth of the furnace by means of suitable slots having such a length as to permit the longitudinal movement of the uprights 30 over the required amplitude.

Figure 10:
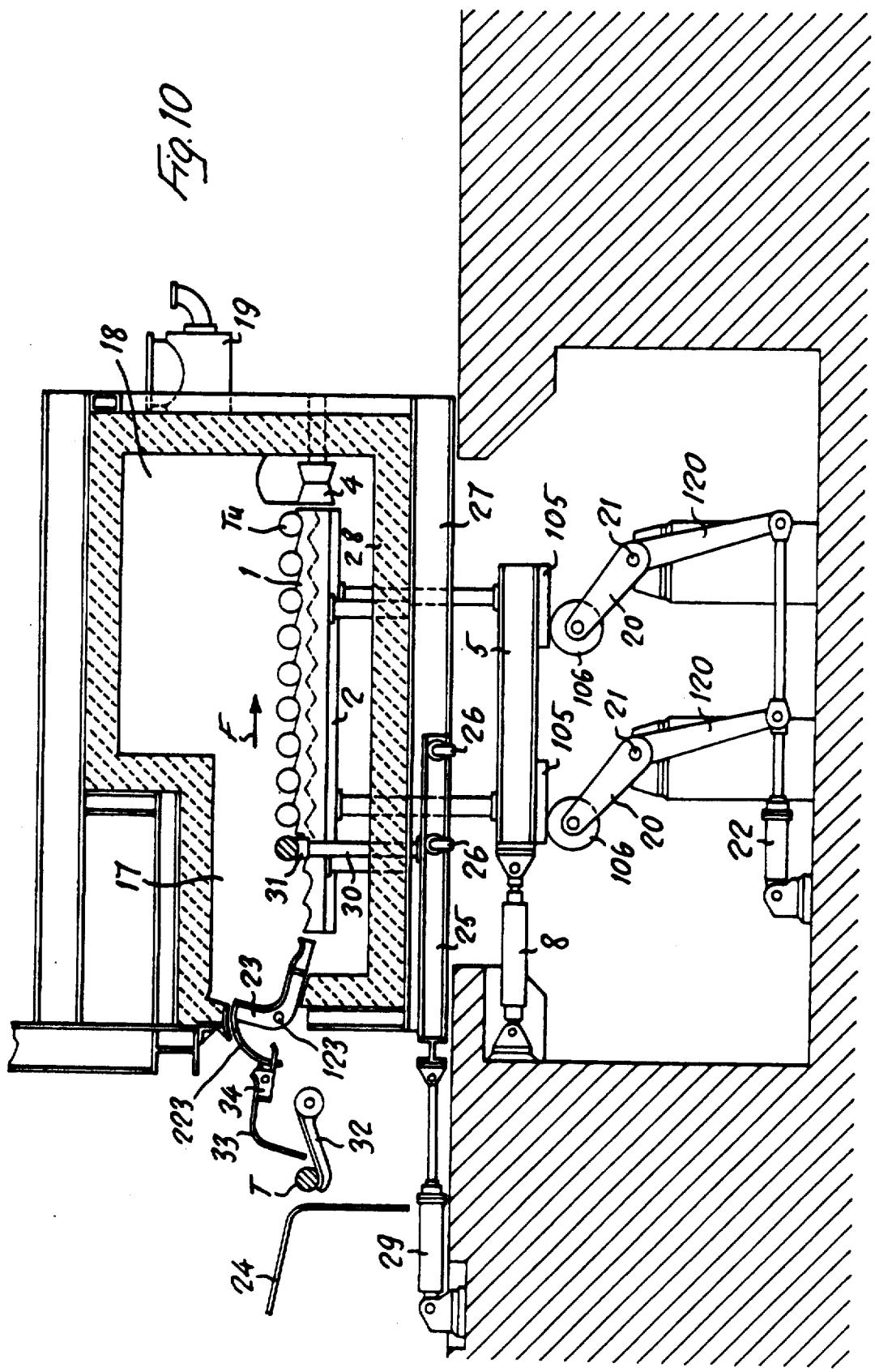
FIG. 10 is a diagrammatic vertical longitudinal sectional view of a further embodiment of a walking beam furnace according to the invention.

In a normal operational cycle, the pipe T coming from the rough-roller is, as shown in FIG. 10, at the bottom of the chute 24, on the lever arms 32 which, thereafter, are oscillated to lay down the pipe T onto a successive chute 33, as shown in FIG. 11. Thereafter, as shown in FIG. 12, a stop member 34 is lowered by the action of the oscillatable door 23 which is overturned so that its concavity faces said chute 33, whereby the pipe T will no more be restrained and will fall into said door 23. The door 23 is then rotated, still maintaining its concavity facing upwards, to the position shown in FIG. 13 whereby the pipe, now within the furnace, will roll off the door 23 to be received in the groove of the charger device 31. The door 23 assures a partial seal during its rotation and a prefect seal when in its forthcoming pipe receiving position (FIG. 12) and in its pipe delivering position onto the charger device (FIG. 13). The door actuates the stop member 34 mechanically by means of its lug 223.

The charger device 31 having a pipe in its pipe-carrying groove, is moved, when the walking beams are in their lowered position, in the direction F to the first available groove behind the range of pipes already charged in the furnace, as shown in FIG. 10. The walking beams 2 are then raised to pick up the just-charged pipe and the previously charged pipes, as shown in FIG. 11. The walking beams 2 are then advanced in the direction F, while the charger device 31 is moved backwards empty and ready to receive the next pipe to the charger, as shown in FIG. 12. The walking beams 2 are then lowered to discharge the last pipe of the range of pipes onto the roller pathway 4 which will carry the same out of the furnace, while all the other pipes will be laid down into the respective grooves of the fixed beams 1 after moving one step forwards in the direction F. Three grooves on the fixed beams 1 have been left empty. The cycle described above will then be repeated, while in the meantime a new pipe has already been charged into the furnace.

In case of an emergency, when the pipes cannot be discharged from the furnace, the last pipe T' which had been charged into the furnace and has arrived at the first available groove of the walking beams 2 behind the range of the previously charged pipes according to the normal cycle described above, as seen in FIG. 11, is laid down by the walking beams 2 onto the fixed beams 1, without previously advancing the walking beams 2 in the direction F. Thus, said pipe will be laid down into the first of the available grooves which are formed in the fixed bemas purposely fro such an emergency, and at the same time the pipe which was ready to be discharged from the furnace will not be discharged onto the roller pathway and, therefore, will be retained in the furnace.

Figure 17:
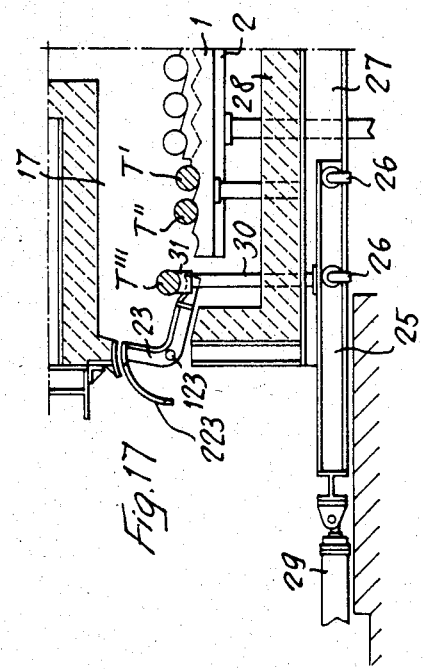
Figure 18:
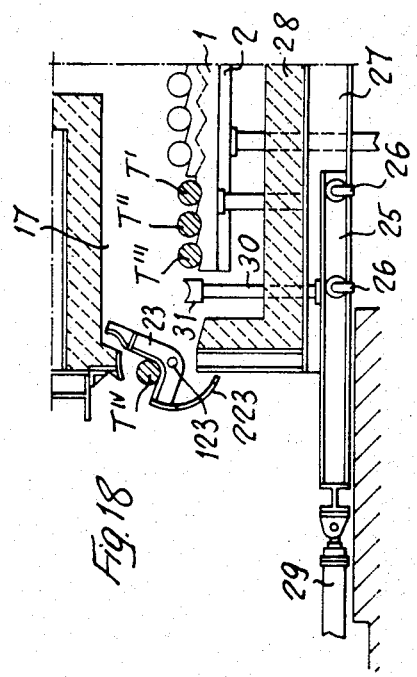
Figure 19:
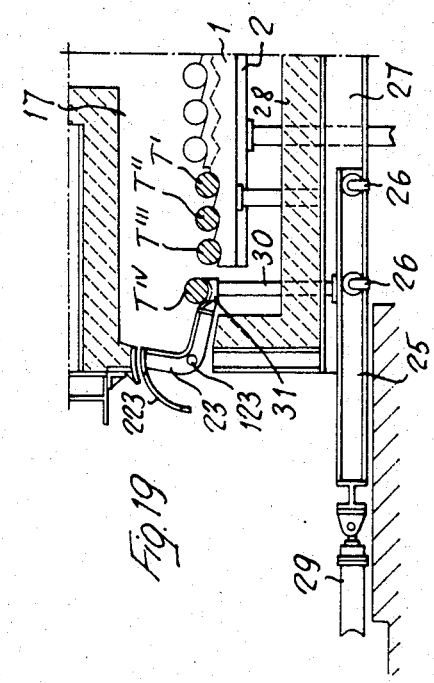

In FIG. 14, the pipe T' charged last before the occurrence of the emergency is already in the first available groove formed in view of an emergency in the fixed beams 1, the walking beams 2 being in their lowered position, while a second pipe T" is on the charger device. The second pipe T" is then brought by the charger device to such a position whereby it will be laid down into the second available groove of the walking beams 2, when the latter will raise without moving longitudinally of the furnace, and thereafter said pipe T" is laid down into the second available groove of the fixed beams 1 when the walking beams 2 are lowered, again without moving longitudinally. The charger device is then moved backwards, while the walking beams are in their raised position, to repeat its cycle and bring a third pipe T''' in the last available groove, as seen in FIGS. 16, 17 and 18. A fourth pipe $T^{IV}$ is then introduced and left on the charger device, as seen in FIG. 19.

The portion of the fixed beams 1 comprising the grooves which are left available in the normal operational cycle and which are occupied by the pipes in the emergency cycle, has a smaller height than the remaining portion of said fixed beams, whereby the charger device, which shall move in the direction F above the first-mentioned length of the fixed beams, may also have a smaller height. This permits the walking beams 2 to have a shorter vertical stroke during the normal cycle.

When the emergency is over and the normal cycle is resumed, the walking beams will move vertically and horizontally with the movements of a normal cycle, as specified above, however without introducing any more pipes. The walking beams, in this cycle for restoring the normal operating conditions, perform a longer vertical stroke to permit the pipes to clear the greater height of the fixed beams between the portion thereof accommodating the emergency grooves and the remaining portion thereof. When the number of pipes discharged from the furnace is the same as the number of pipes introduced during the emergency cycle and as many grooves have been made available by transferring the pipes therein toward the furnace chamber, the normal cycle described above is resumed wherein one pipe will be introduced each time one pipe is discharged, and the vertical stroke of the walking beams will be reduced by the additional amount which was necessary to clear the greater height of the fixed beams at the portion thereof comprising the emergency grooves.

We claim:

1. A walking beam furnace for hot-rolling pipes or the like, located between a rough-roller and a sizing roller, comprising fixed beams (1) and walking beams (2) formed with a plurality of pipe-carrying grooves over the entire length thereof, characterized in that the number of said grooves is higher than the number of pipes usually accommodated in the furnace, whereby some of them will be left available and are used in case of an emergency to receive the pipes which are upstream of the furnace and which have already been worked in a plug-mill, a charger means (11; 31) for introducing and charging the pipes into the furnace to leave said emergency grooves empty when the furnace is working normally and to introduce into the furnace and position into said empty grooves the pipes coming from the plug mill when as many pipes cannot be discharged from the furnace due to the disactivation of the sizing mill located downstream, said charging means comprising a door (3; 23) for closing the furnace and for introducing the pipes into the furnace, and a charger device (11; 31) adapted to receive the pipes just introduced by said door and to convey said pipes over the grooves to be left empty for said emergency and to place said pipes onto the fixed beams (1) and walking beams (2) to convey them toward the outlet according to the normal operational cycle, said charger device comprising means for selectively effecting strokes above the empty grooves to position in each groove one of the pipes which has been introduced during an emergency.

2. A furnace according to claim 1, characterized in that it comprises in the interior thereof, just after the door (3, 23) for introducing the pipes, a charger device (11; 31) which, during the normal operation, advances each pipe which has been introduced, during one single cycle of movement of said walking beams (2), to one of the grooves of the fixed beams (1) following the first groove, said pipe being then picked up therefrom by said transfer walking beams (2) at the beginning of their next cycle of movements, leaving one or more initial stationary grooves empty, whereas in case of an emergency wherein the discharge from the furnace is discontinued, some pipes may still be charged into the furnace, said pipes being positioned by the charger device (11; 31) into the initial empty groove or grooves in the fixed beams (1) and, upon resumption of the discharge, said pipes are advanced by the charger device (11; 31) in synchronism with the transfer walking beams (2), and the introduction of pipes is resumed after said initial groove or grooves in the fixed beams have been made available again.

3. A furnace according to claim 2, characterized in that said charger device comprises an assembly of short charger walking beams (11) formed with a limited number of grooves and co-operating with the fixed beams (1) similarly to the transfer walking beams (2) but with a frequency which can be varied independently from that of said transfer walking beams (2).

4. A furnace according to claim 3, characterized in that said charger beams (11) are carried by a structure (12) which is vertically slidably mounted in a guide (112) which is oscillatable about a stationary horizontal pivot, transverse to the beams (1, 2), and is actuated by a crank (15).

5. A furnace according to claim 2, characterized in that said charger device comprises a series of uprights (30) each supporting a head (31) having a pipe-carrying groove, which are mounted on a carriage (25) located below the hearth (28) of the furnace and slidable along the length of the furnace over guides (27) through wheels (26) by the action of actuating means (29).

6. A furnace according to claim 5, characterized in that said actuating means for moving the carriage (25) back and forth along the length of the furnace comprise a hydraulic actuating cylinder (29).

7. A furnace according to claim 1, characterized in that said door (23) for closing the furnace has an "L" configuration with a concavity and is oscillatably mounted on a pivot (123) located at the corner of the "L" so that the concavity of the "L" is facing upwards, said door being provided with means to actuate, when said concavity is facing towards the exterior of the furnace, a suitable stop member (34) which, when lowered, permits a pipe to drop down from a stand-by chute (33) be accommodated into the concavity of said door (23), said door being then rotated so that its concavity will be facing toward the interior whereby said pipe will be delivered onto the charger device (31), said door assuring a substantially sealed closure when it receives said pipe from the outside and when it delivers it into the furnace, and assuring a partial seal during the oscillatory movement thereof.

8. A method for intermediate heating of pipes in a hot rolling mill by means of a walking beam furnace, located between the rolling mill and a sizing mill and having a forehearth zone without burners, a heat zone with burners, a charging end and a discharging end, by carrying the pipes stepwise from the charging end to the discharging end of the furnace through the forehearth zone and the heat zone, comprising the steps of:
   (a) maintaining a temperature from about 800° to 850° C. in the forehearth zone,
   (b) introducing the pipes in the foreheath zone at different respective temperatures ranging from 700° to 1000° C.,
   (c) maintaining the pipes in the forehearth zone until they all reach a substantially same temperature of about 850° C.,
   (d) heating the pipes in the heat zone to a discharge temperature of from about 920° to 980° C.

9. A walking beam furnace for the intermediate heating of pipes during the hot rolling thereof, said furnace comprising:

(a) a forehearth zone without burners and a heat zone with burners, arranged in series between charging and discharging ends of the furnace, (b) a plurality of parallel stationary beams extending longitudinally between the charging and discharging ends of the furnace, (c) a plurality of parallel walking beams extending longitudinally between the charging and discharging ends of the furnace, (d) pipe-carrying notches in the top side of the stationary and walking beams, (e) at least one pipe-storage notch provided in the top side of each of the charging ends of the stationary beams which is out of the operating range of the walking beams, (f) means for raising and lowering the walking beams and moving them back and forth in the longitudinal direction of the furnace to transport the pipes stepwise through the furnace from one of the pipe-carrying notches in the stationary beams to another, (g) a charging door at the charging end of the furnace, pivotally mounted about an horizontal axis for introducing the pipes one at a time into the furnace, (h) a charger device mounted in the furnace at the charging end thereof and provided with at least one pipe-carrying notch, (i) means for raising and lowering said charger device and for reciprocating it in the longitudinal direction of the furnace, from a pipe-receiving position in proximity to the charging door to receive a pipe introduced by the charging door, to a pipe-depositing position to deposit the pipe either in a pipe-storage notch or in a first pipe-carrying notch of the stationary beams, or else from a pipe-withdrawal position, to take up a pipe from a pipe-storage notch of the stationary beams, to a pipe-depositing position to deposit the pipe in said first pipe-carrying notch of the stationary beams.

10. A walking beam furnace according to claim 9, wherein the charger device comprises a plurality of charger beams arranged between the stationary beams and the walking beams and driven independently of the walking beams.

11. A walking beam furnace according to claim 10, wherein the charger beams are carried by a structure which is slidably mounted in a guide which is pivotable about a stationary horizontal axis and is actuated by a crank.

12. A walking beam furnace for the intermediate heating of pipes during the hot rolling thereof, said furnace comprising:

(a) a forehearth zone without burners and a heat zone with burners, arranged in series between charging and discharging ends of the furnace, (b) a plurality of parallel stationary beams extending longitudinally between the charging and discharging ends of the furnace, (c) a plurality of parallel walking beams extending longitudinally between the charging and discharging ends of the furnace, (d) pipe-carrying notches in the top side of the stationary and walking beams, (e) at least one pipe-storage notch provided in the top side of each of the charging ends of the stationary beams within the operating range of the walking beams, (f) means for raising and lowering the walking beams and moving them back and forth in the longitudinal direction of the furnace, to transport the pipes stepwise through the furnace from one of the pipe-carrying notches in the stationary beams to the other, or from one pipe-storage notch in the stationary beams to the first pipe-carrying notch thereof, (g) a charging door at the charging end of the furnace, pivotably mounted about an horizontal axis for introducing the pipes one at a time in the furnace, (h) a charger device mounted in the furnace at the charging end thereof and provided with at least one pipe-carrying notch, (i) means for reciprocating said charger device in the longitudinal direction of the furnace from a pipe-receiving position in proximity to the charger door, to receive a pipe introduced by the charging door, to a pipe-delivery position, in which its pipe-carrying notch is aligned either with a pipe-storage notch or a pipe-carrying notch in the stationary beams.

13. A walking beam furnace according to claim 12, wherein the charger device comprises a plurality of charger heads arranged between the stationary beams and the walking beams and driven independently of the walking beams.

14. A walking beam furnace according to claim 13, wherein the charger heads are mounted by means of uprights on a wheeled carriage located below the furnace hearth and movable by actuating means on guides in the longitudinal direction of the furnace.

15. A walking beam furnace according to claim 14, wherein the charging door has an "L" configuration with a concavity and is mounted on an horizontal pivot located at the corner of the "L" so that the concavity of the "L" is facing upward, said door is pivotable from a pipe-receiving position, in which its concavity is facing towards the exterior of the furnace and receives a pipe to be introduced in the furnace, to a pipe-delivery position, in which its concavity is facing towards the interior of the furnace and lets drop down the pipe onto the charger heads.

* * * * *

REEXAMINATION CERTIFICATE (1429th)
United States Patent [19]
Bocci et al.

[11] B1 4,585,411
[45] Certificate Issued  Mar. 12, 1991

[54] METHOD AND WALKING BEAM FURNACE FOR THE INTERMEDIATE HEATING OF PIPES IN HOT ROLLING MILLS

[75] Inventors: Giorgio Bocci; Sando Brizielli; Agostino Triuzzi; Stefano Deplano, all of Genoa, Italy

[73] Assignee: Italimpianti Societe Italiana Impianti P.A.

Reexamination Request:
No. 90/001,950, Mar. 2, 1990

Reexamination Certificate for:
Patent No.: 4,585,411
Issued: Apr. 29, 1986
Appl. No.: 627,003
Filed: Jun. 29, 1984

[30] Foreign Application Priority Data

Jul. 6, 1983 [IT] Italy ............................ 12565 A/83
May 18, 1984 [IT] Italy ............................ 12519 A/84

[51] Int. Cl.$^5$ ............................................. F27D 3/00
[52] U.S. Cl. ....................................... 432/11; 432/122; 198/463.5; 198/614; 198/744; 414/180
[58] Field of Search .................. 432/11, 122; 414/180; 198/463.5, 614, 744

[56] References Cited

U.S. PATENT DOCUMENTS

2,329,211  9/1943  Morton .
3,618,741  11/1971 Berndt .
4,135,704  1/1979  Elhaus et al. .
4,214,868  7/1980  Tabuchi .
4,397,600  8/1983  Jacubowiez .

FOREIGN PATENT DOCUMENTS

1161573  2/1967   Fed. Rep. of Germany .
2319093  12/1977  France .
1214725  12/1970  United Kingdom .

*Primary Examiner*—Henry C. Yuen

[57] ABSTRACT

This invention relates to a method of and a walking beam furnace for the intermediate heating of pipes, or the like, in hot rolling mills, by means of a furnace located between the plug-mill and the sizing mill. According to the invention, in a forehearth (17) of the intermediate heating furnace, at the inlet side thereof, there is maintained a temperature which is lower than that at the outlet side, and which, anyway, is such that the hottest pipes will be cooled down and the coldest pipes will be heated up whereby, when exiting from said forehearth (17) of the furnace, the difference between the temperatures of the various pipes is zero or, at least, is small and, in any case, is smaller than that at the inlet, whereas in the successive chamber (18) of the furnace there is maintained such a temperature as to give the pipes the desired temperature when exiting from the furnace. Preferably, the forehearth (17) is not provided with burners and is heated in an indirect manner by the successive furnace chamber (18) which is provided with one or more burners (19). This invention also provides an intermediate heating furnace of the walking beam type, provided with loading or charging means (11;31) permitting some pipes, or the like, to be charged into the furnace even after an emergency interruption of the discharging operation.

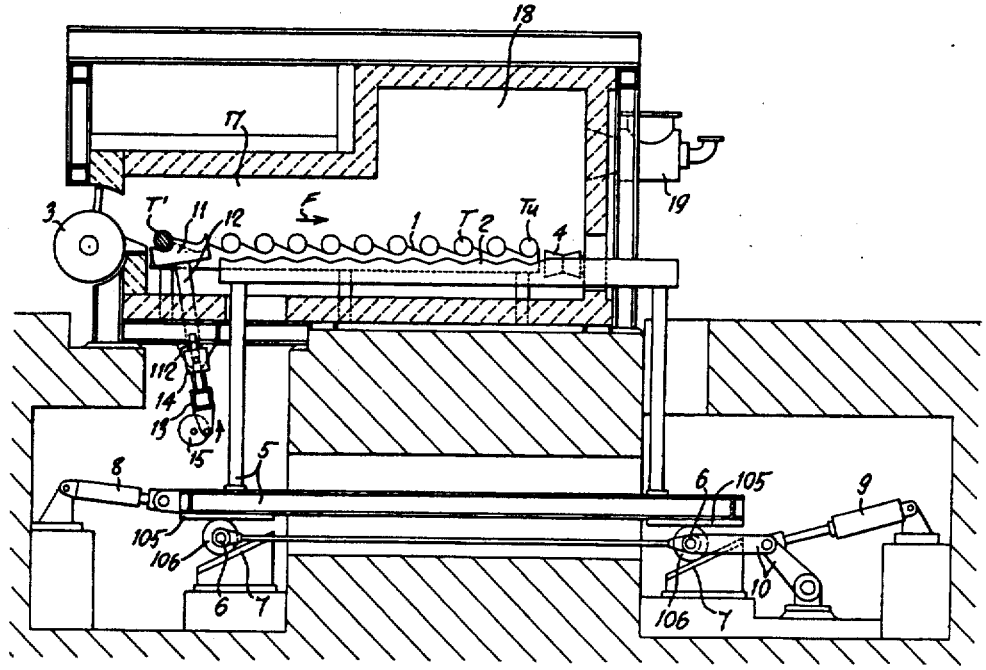

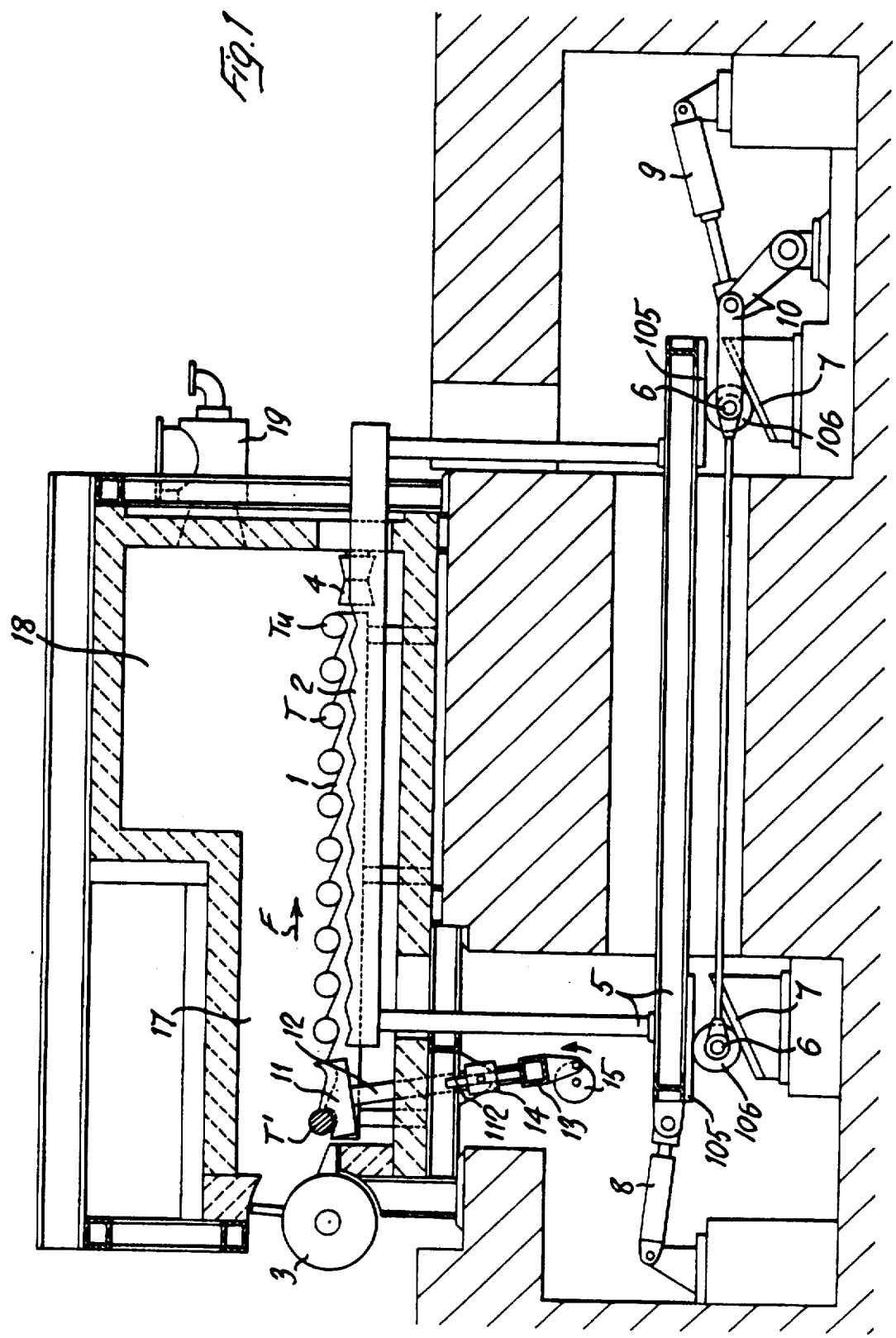

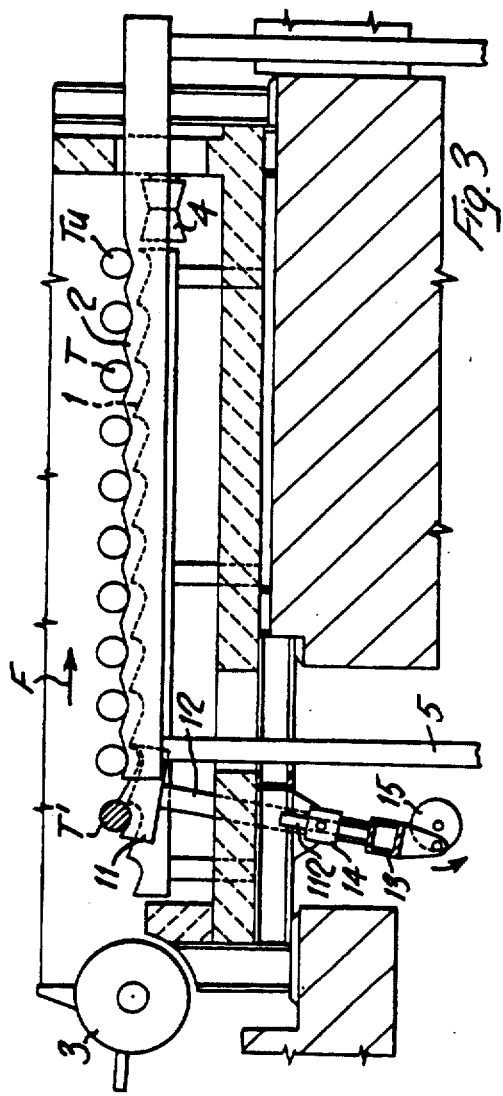
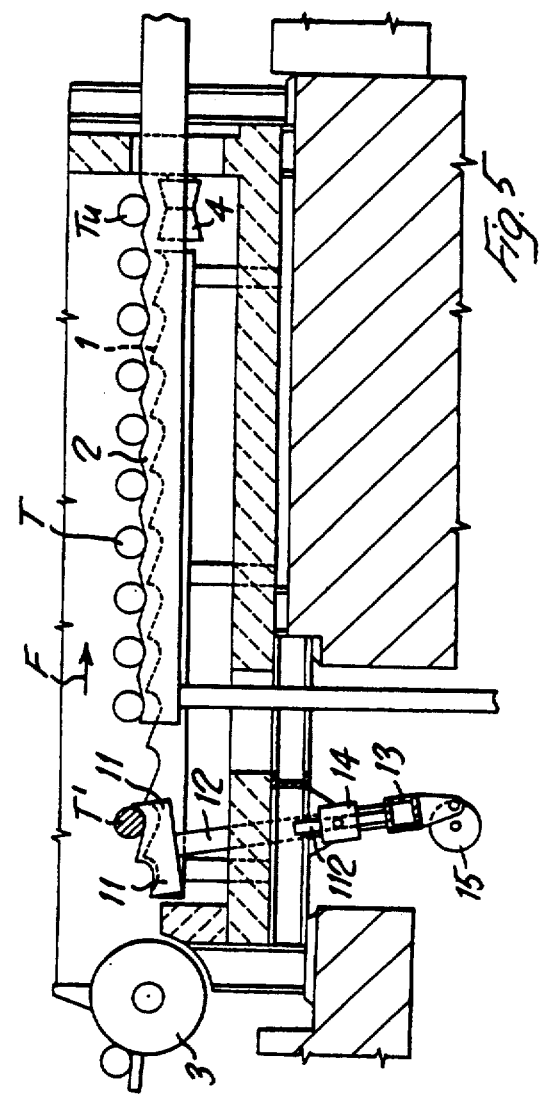
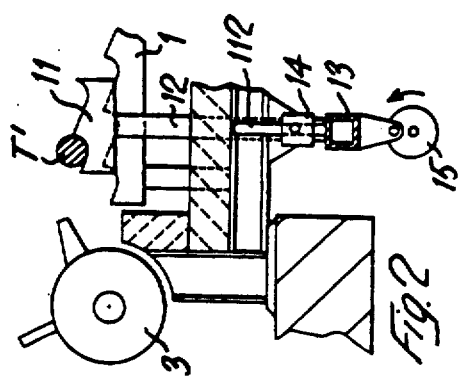
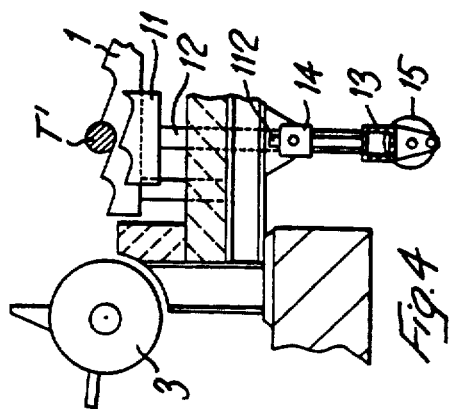

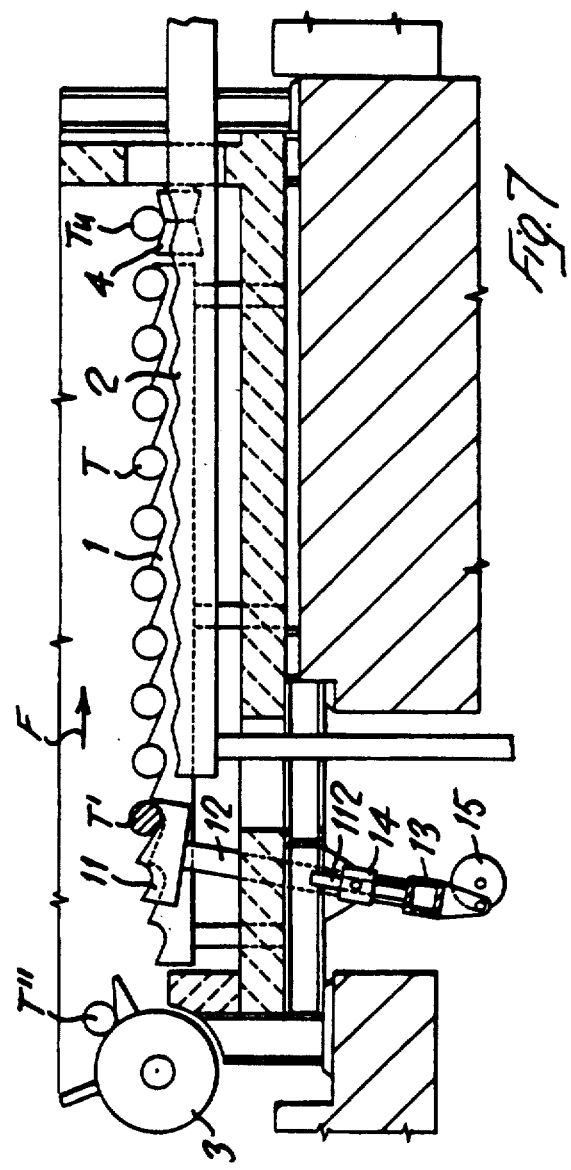
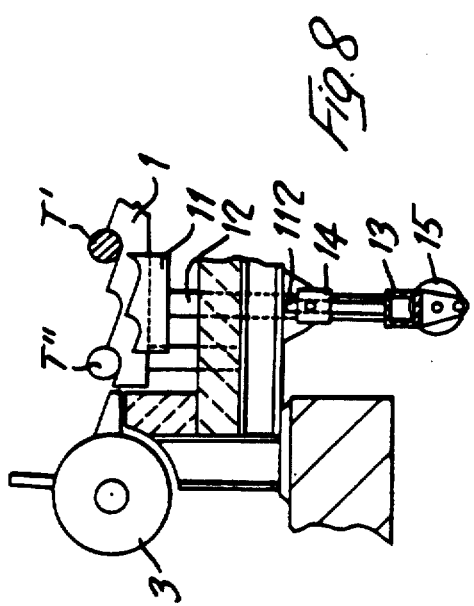
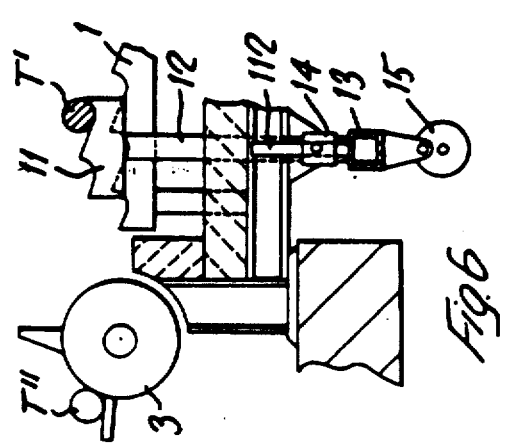

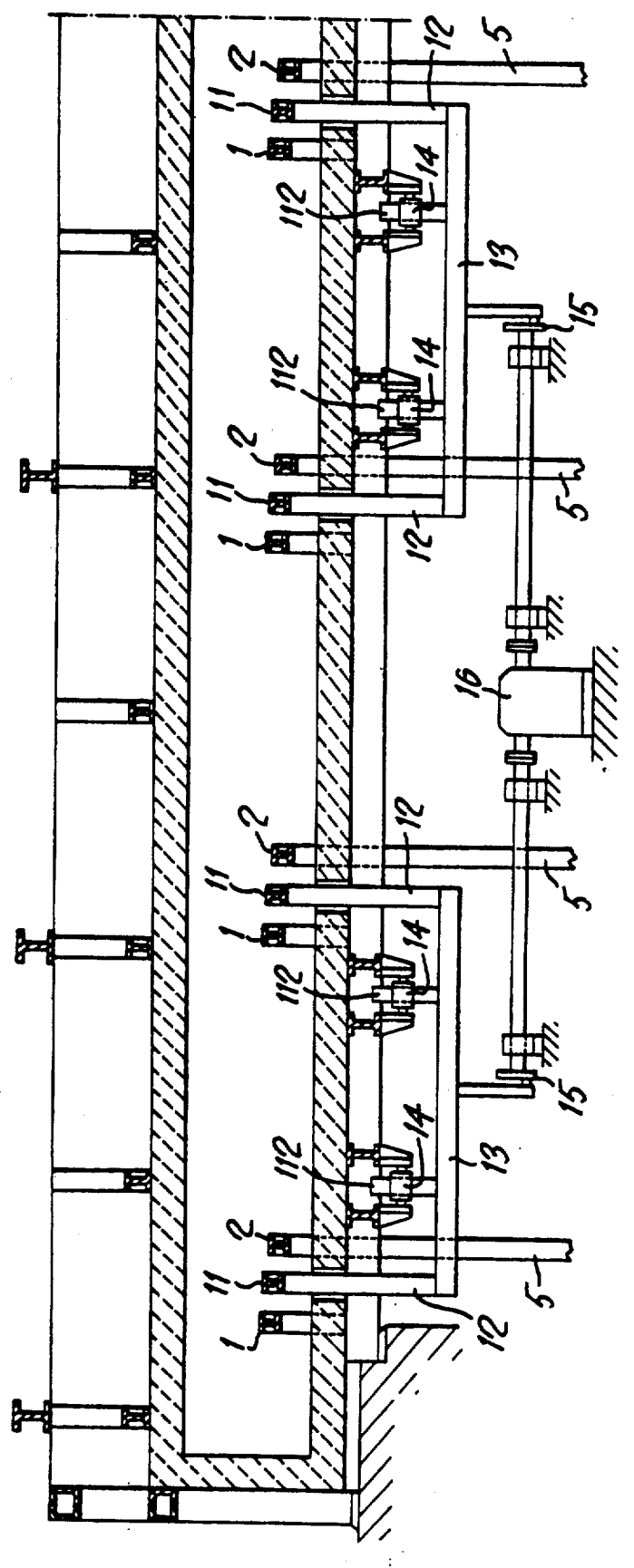

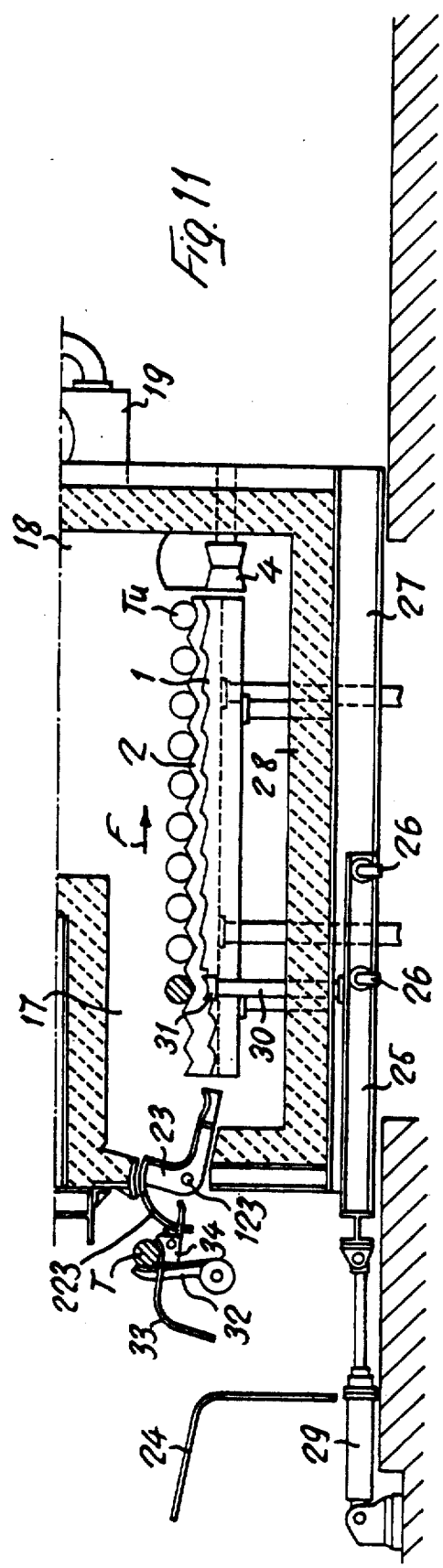
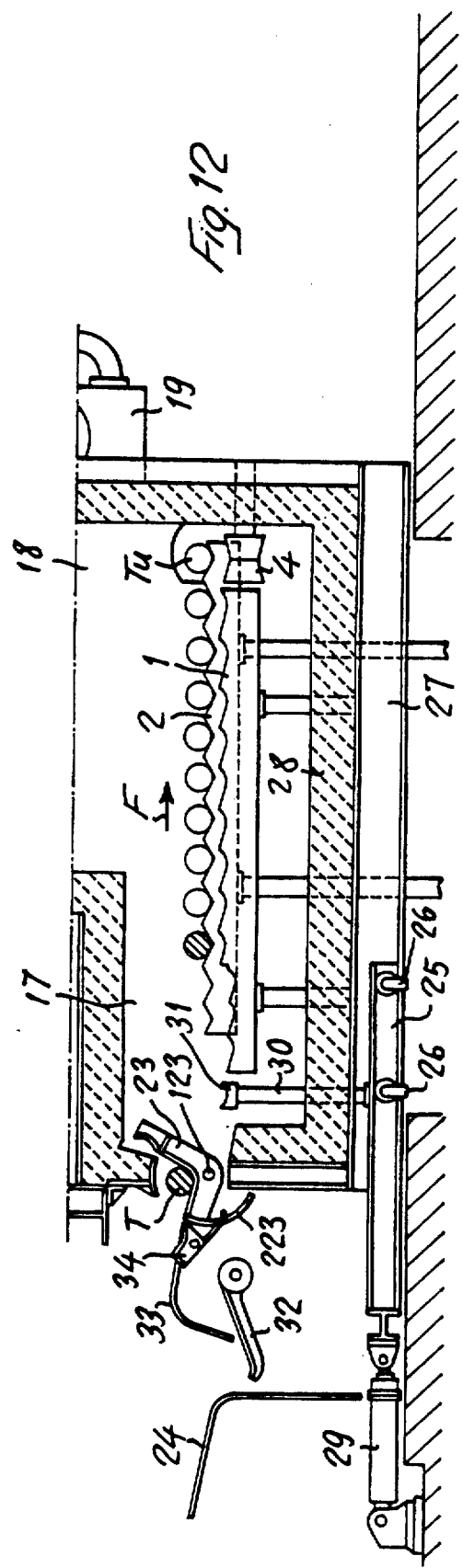

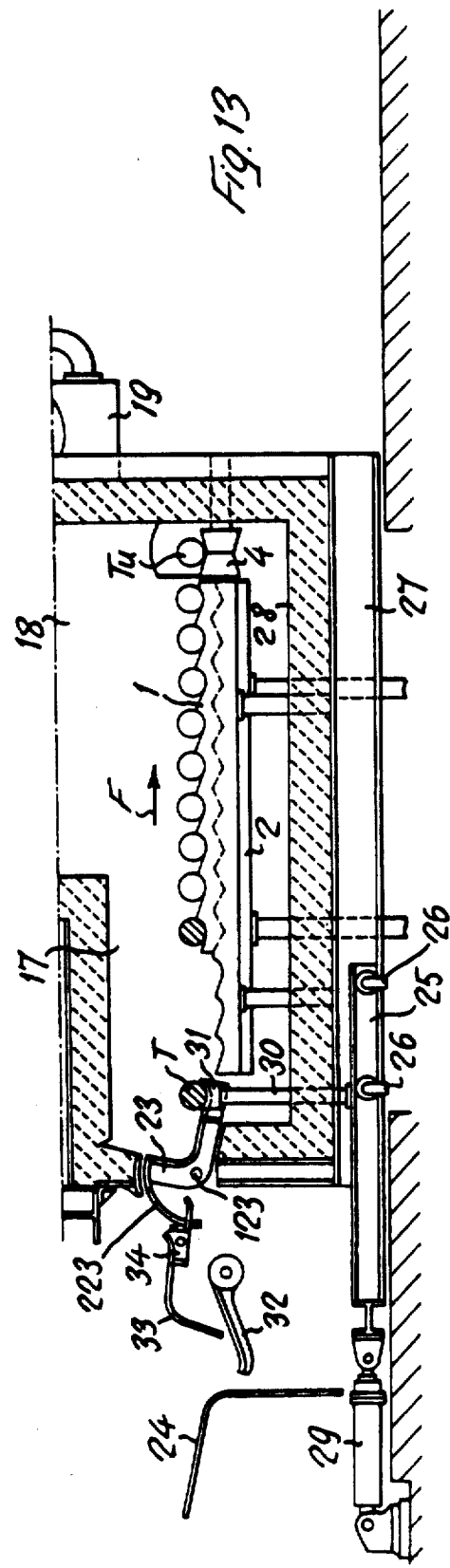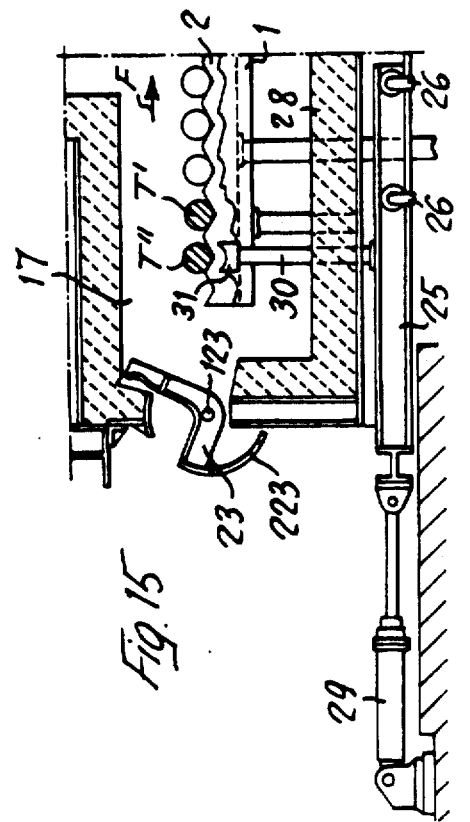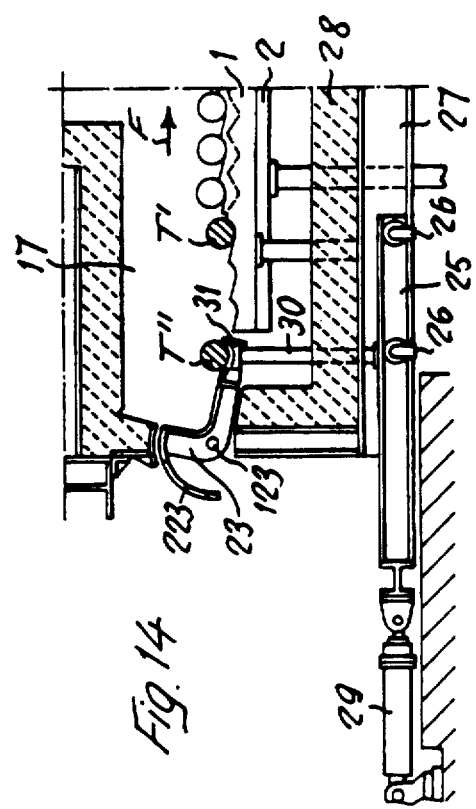

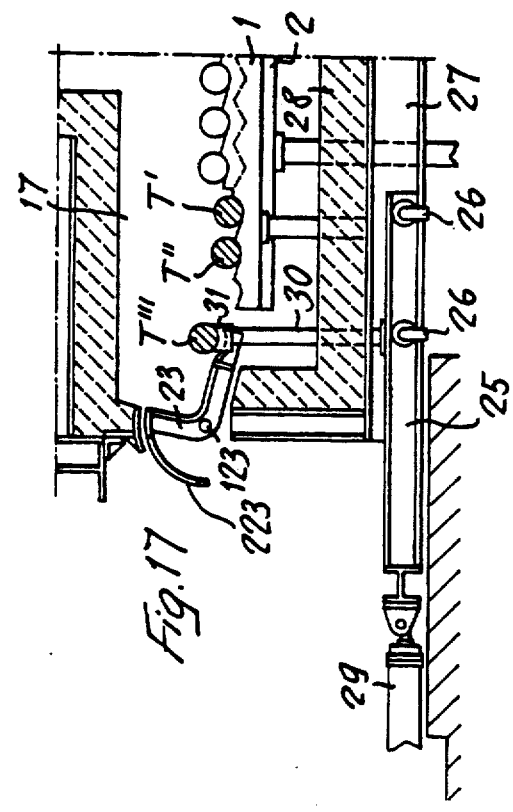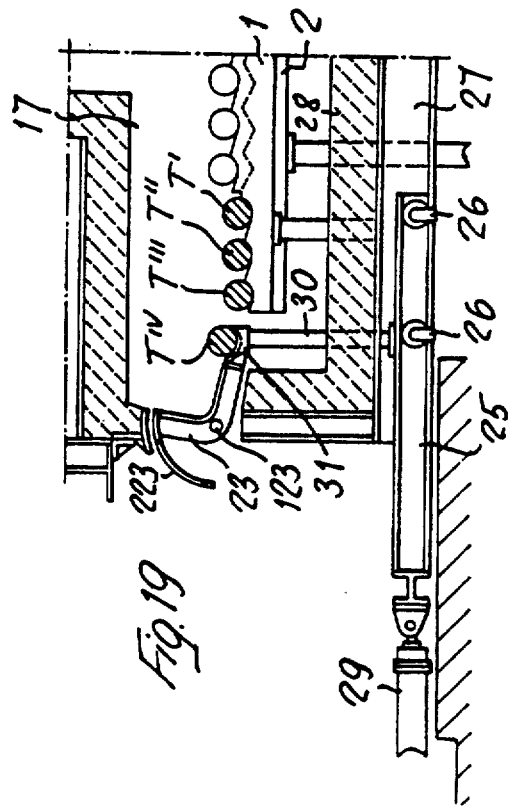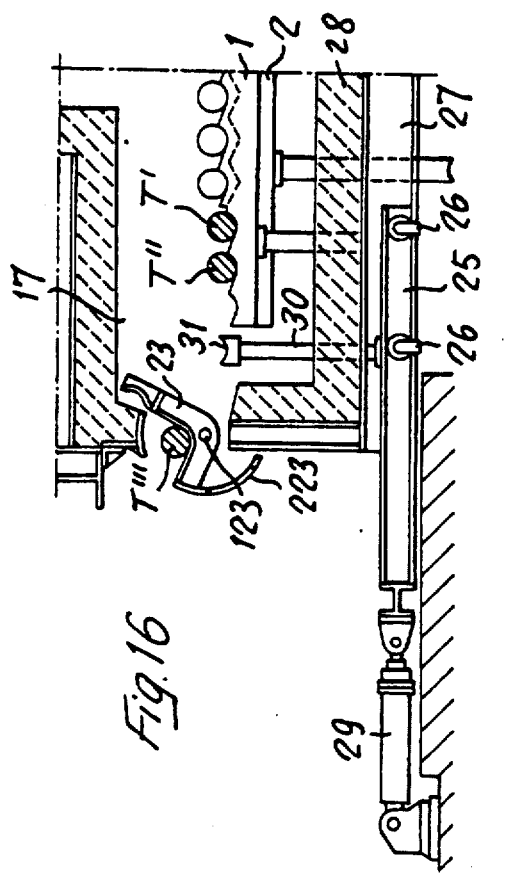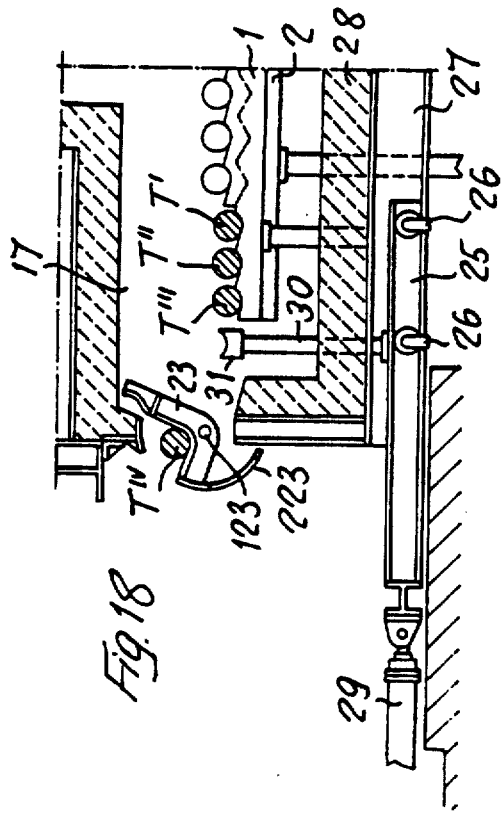

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

ONLY THOSE PARAGRAPHS OF THE SPECIFICATION AFFECTED BY AMENDMENT ARE PRINTED HEREIN.

Column 5, lines 27–54:

It is assumed that a rough rolled pipe T' to be heated, introduced into the furnace through the door 3 and shown with [hatching] *hatched* lines in the FIGS. 1 to 8, is in the first pipe-carrying groove of the fixed beams 1, and that the transfer walking beams 2 are in their lowered and rearmost position, and the charger walking beams 11 are in their rearmost and partly raised position, with their first pipe-carrying groove in co-axial and flush relation with the first pipe-carrying groove of the fixed beams 1, as shown in FIG. 1. Thereafter, the charger beams 11 pick up the first pipe T' which has been fed to the first pipe-carrying groove of the fixed beams 1 (FIG. 2) and move [forwards] *forward* in the direction of the arrow F (FIG. 4) to deposit the pipe T' into the second pipe-carrying groove of the fixed beams 1 (FIG. [5] *3*). The charger beams 11[,] then [,] move back to their original position (FIG. 5) and thereafter, with an upward movement and a translatory movement in the direction of the arrow F, pick up by means of their second groove the pipe T' from the fixed beams 1 (FIG. 6) and transfer said pipe to the third pipe-carrying groove of the fixed beams 1 (FIGS. 7 and 8). From this position [onwards] *onward*, the transfer walking beams 2 take over and, with an upward movement (FIG. 3) and a translatory forward movement (FIG. 5), will position the pipe T' into the fourth pipe-carrying *groove* of the fixed beams 1 while the last pipe Tu at the outlet side of the furnace is discharged onto the roller pathway 4 to be taken out of the furnace (FIG. 1).

Column 7, line 55 thru Column 8, line 5:

In a normal operational cycle, the pipe T coming from the rough-roller is, as shown in FIG. 10, at the bottom of the chute 24, on the lever arms 32 which, thereafter, are oscillated to lay down the pipe T onto a successive chute 33, as shown in FIG. 11. Thereafter, as shown in FIG. 12, a stop member 34 is lowered by the action of the oscillatable door 23 which is overturned so that its concavity faces said chute 33, whereby the pipe T will no more be restrained and will fall into said door 23. The door 23 is then rotated, still maintaining its concavity facing upwards, to the position shown in FIG. 13 whereby the pipe, now within the furnace, will roll off the door 23 to be received in the groove of the charger device 31. The door 23 assures a partial seal during its rotation and a [prefect] *perfect* seal when in its forthcoming pipe receiving position (FIG. 12) and in its pipe delivering position onto the charger device (FIG. 13). The door actuates the stop member 34 mechanically by means of its lug 223.

Column 8, lines 27–41:

In case of an emergency, when the pipes cannot be discharged from the furnace, the last pipe T' which had been charged into the furnace and has arrived at the first available groove of the walking beams 2 behind the range of the previously charged pipes according to the normal cycle described above, as seen in FIG. 11, is laid down by the walking beams 2 onto the fixed beams 1, without previously advancing the walking beams 2 in the direction F. Thus, said pipe will be laid down into the first of the available grooves which are formed in the fixed [bemas] *beams* purposely [fro] *for* such an emergency, and at the same time the pipe which was ready to be discharged from the furnace will not be discharged onto the roller pathway and, therefore, will be retained in the furnace.

AS A RESULT OF REEXAMINATION, IT HAS BEEN DETERMINED THAT:

The patentability of claims 9–11 is confirmed.

Claim 15 is cancelled.

Claims 1, 2, 7, 8, 12 are determined to be patentable as amended.

Claims 3–6, 9–11, 13 and 14, dependent on an amended claim, are determined to be patentable.

1. A walking beam furnace for hot-rolling pipes or the like, located between a rough-roller and a sizing roller, comprising fixed beams (1) and walking beams (2) formed with a plurality of pipe-carrying grooves over the entire length thereof, characterized in that the number of said grooves is higher than the number of pipes usually accommodated in the furnace, whereby some of them *comprise emergency grooves and* will be left available [and are used] *for use* in case of an emergency to receive the pipes which are upstream of the furnace and which have already been worked in a plug-mill, a charger means (11; 31) for introducing and charging the pipes into the furnace to leave said emergency grooves empty when the furnace is working normally and to introduce into the furnace and position into said [empty] *emergency* grooves the pipes coming from the plug mill when as many pipes cannot be discharged from the furnace due to the disactivation of the sizing mill located downstream, said [charging] *charger* means comprising a door (3; 23) for closing the furnace and for introducing the pipes into the furnace, and a charger device (11; 31) adapted to receive the pipes just introduced by said door and to convey said pipes over the grooves to be left empty for said emergency and to place said pipes onto the fixed beams (1) and walking beams (2) to convey them toward the outlet according to the normal operational cycle, said charger device comprising means for selectively effecting strokes above the [empty] *emergency* grooves to position in each groove one of the pipes which as been introduced during an emergency, *wherein said door has an "L" configuration and is oscillatably mounted on a pivot (123) located at the corner of the "L", so that the concavity of the "L" is facing upwards and by rotating the door is alternately turned toward the exterior of the fur-*

*nace for receiving a pipe (T) and toward the interior of the furnace for extending into the furnace adjacent the charger device and laying the pipe onto the charger device (11, 31), said door (3, 32) assuring a sealed closure when it receives a pipe (T) from the outside and when it delivers said pipe onto the charger device and assuring at least a partial seal during the oscillatory movement.*

2. [A furnace according to claim 1,] *A walking beam furnace for hot-rolling pipes of the like, located between a rough-roller and a sizing roller, comprising fixed beams (1) and walking beams (2) formed with a plurality of pipe-carrying grooves over the entire length thereof, characterized in that the number of said grooves is higher than the number of pipes usually accommodated in the furnace, whereby some of them comprise emergency grooves and will be left available for use in case of an emergency to receive the pipes which are upstream of the furnace and which have already been worked in a plug-mill, a charger means (11; 31) for introducing and charging the pipes into the furnace to leave said emergency grooves empty when the furnace is working normally and to introduce into the furnace and position into said emergency grooves the pipes coming from the plug mill when as many pipes cannot be discharged from the furnace due to the disactivation of the sizing mill located downstream, said charger means comprising a door (3; 23) for closing the furnace and for introducing the pipes into the furnace, and a charger device (11; 31) adapted to receive the pipes just introduced by said door and to convey said pipes over the grooves to be left empty for said emergency and to place said pipes onto the fixed beams (1) and walking beams (2) to convey them toward the outlet according to the normal operational cycle, said charger device comprising means for selectively effecting strokes above the emergency grooves to position in each groove one of the pipes which as been introduced during an emergency, and characterized in that it comprises in the interior thereof, just after the door (3[,]; 23) for introducing the pipes, a charger device (11; 31) which, during the normal operation, advances each pipe which has been introduced, during one single cycle of movement of said walking beams (2), to one of the grooves of the fixed beams (1) following the first groove, said pipe being then picked up therefrom by said transfer walking beams (2) at the beginning of their next cycle of movements, leaving one or more initial stationary grooves empty, whereas in case of an emergency wherein the discharge from the furnace is discontinued, some pipes may still be charged into the furnace, said pipes being positioned by the charger device (11; 31) into the initial empty groove or grooves in the fixed beams (1) and, upon resumption of the discharge, said pipes are advanced by the charger device (11; 31) in synchronism with the transfer walking beams (2), and the introduction of pipes is resumed after said initial groove or grooves in the fixed beams have been made available again.*

7. A furnace according to claim [1] 2, characterized in that said door (23) for closing the furnace has an "L" configuration with a concavity and is oscillatably mounted on a pivot (123) located at the corner of the "L" so that the concavity of the "L" is facing upwards, said door being provided with means to actuate, when said concavity is facing towards the exterior of the furnace, a suitable stop member (34), which, when lowered, permits a pipe to drop down from a stand-by chute (33) be accommodated into the concavity of said door (23), said door being then rotated so that its concavity will be facing towards the interior whereby said pipe will be delivered onto the charger device (31), said door assuring a substantially sealed closure when it receives said pipe from the outside and when it delivers it into the furnace, and assuring a partial seal during the oscilatory movement thereof.

8. A method for intermediate heating of pipes in a hot rolling mill by means of a walking beam furnace, located between the rolling mill and a sizing mill and having a forehearth zone without burners, a heat zone with burners, a charging end and a discharging end, by carrying the pipes stepwise from the charging end to the discharging end of the furnace through the forehearth zone and the heat zone, comprising the steps of:
 (a) maintaining a temperature from about 800° to 850° C. in the forehearth zone,
 (b) introducing the pipes in the [foreheath] *forehearth* zone at different respective temperatures ranging from 700° to 1000° C.,
 (c) maintaining the pipes in the forehearth zone until they all reach a substantially same temperature of about 850° C. and,
 (d) heating the pipes in the heat zone to a discharge temperature of from about 920° to 980° C.

12. A walking beam furnace for the intermediate heating of pipes during the hot rolling hereof, said furnace comprising:
 (a) a forehearth zone without burners and a heat zone with burners, arranged in series between charging and discharging ends of the furnace,
 (b) a plurality of parallel stationary beams extending longitudinally between the charging and discharging ends of the furnace,
 (c) a plurality of parallel walking beams extending longitudinally between the charging and discharging ends of the furnace,
 (d) pipe-carrying notches in the top side of the stationary and walking beams,
 (e) at least one pipe-storage notch provided in the top side of each of the charging ends of the stationary beams within the operating range of the walking beams,
 (f) means for raising and lowering the walking beams and moving them back and forth in the longitudinal direction of the furnace, to transport the pipes stepwise through the furnace from one of the pipe-carrying notches in the stationary beams to the other, or from one pipe-storage notch in the stationary beams to the first pipe-carrying notch thereof,
 (g) a charging door at the charging end of the furnace, [pivotably] *pivotally* mounted about an horizontal axis for introducing the pipes one at a time in the furnace,
 (h) a charger device mounted in the furnace at the charging end thereof and provided with at least one pipe-carrying notch,
 (i) means for reciprocating said charger device in the longitudinal direction of the furnace from a pipe-receiving position in proximity to the charger door, to receive a pipe introduced by the charging door, to a pipe-delivery position, in which its pipe-carrying notch is aligned either with a pipe-storage notch or a pipe-carrying notch in the stationary beams,
 (j) *wherein said charging door has an "L" configuration and is oscillatably mounted on a pivot (123) located at the corner of the "L", so that the concavity of the "L" is facing upwards and by rotating the door is alter-* nately turned toward the exterior of the furnace for receiving a pipe (T) and toward the interior of the furnace for extending into the furnace adjacent the charger device and laying the pipe onto the charger device (11, 31), said door (3, 32) assuring a sealed closure when it receives a pipe (T) from the outside and when it delivers said pipe onto the charger device and assuring at least a partial seal during the oscillatory movement.

* * * * *